United States Patent
Iyer et al.

(10) Patent No.: US 10,270,822 B2
(45) Date of Patent: Apr. 23, 2019

(54) HYBRID POCKET ROUTER

(71) Applicant: QUALCOMM Incorporated, San Diego, CA (US)

(72) Inventors: Prabhu Ramani Iyer, San Diego, CA (US); Ankur Verma, San Diego, CA (US); Mateen Majeed Khan, San Diego, CA (US); Thadi Manjunath Nagaraj, San Diego, CA (US); Ralph Akram Gholmieh, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 258 days.

(21) Appl. No.: 14/818,160

(22) Filed: Aug. 4, 2015

(65) Prior Publication Data

US 2017/0041361 A1    Feb. 9, 2017

(51) Int. Cl.
*H04L 29/06*    (2006.01)
*H04L 29/08*    (2006.01)
(Continued)

(52) U.S. Cl.
CPC ........ *H04L 65/4076* (2013.01); *H04L 65/605* (2013.01); *H04L 65/608* (2013.01);
(Continued)

(58) Field of Classification Search
CPC . H04L 65/4076; H04L 65/605; H04L 65/608; H04L 65/80; H04L 67/02; H04L 12/18; H04W 36/06; H04W 4/06; H04W 72/005; H04W 76/002; H04W 12/06; H04W 84/12; H04W 92/02; H04W 12/02;
(Continued)

(56) References Cited

U.S. PATENT DOCUMENTS 8,793,743 B2    7/2014   Oyman
2003/0026346 A1*  2/2003  Matsumoto ......... H03M 13/258
                                                  375/262
(Continued)

FOREIGN PATENT DOCUMENTS

EP    2770760 A1 *  8/2014   .............. H04W 4/06
EP    2770760 A1 *  8/2014   .............. H04W 4/06
(Continued)

OTHER PUBLICATIONS

International Search Report and Written Opinion—PCT/US2016/040796—ISA/EPO—Sep. 23, 2016.

*Primary Examiner* — Hardikkumar D Patel

(74) *Attorney, Agent, or Firm* — Arent Fox, LLP

(57) ABSTRACT

A method, an apparatus, and a computer program product for wireless communication are provided. The apparatus may be an MBMS receiver device. The MBMS receiver device receives at least one packet associated with an MBMS service. A configuration for providing the at least one packet to a UE is determined. The configuration may be one of a plurality of different configurations. The plurality of configurations may include at least a first configuration and a second configuration. The MBMS receiver device processes the received at least one packet based on the configuration. The MBMS receiver device sends the processed at least one packet to the UE based on the configuration.

28 Claims, 17 Drawing Sheets

(51) Int. Cl.
*H04W 36/06* (2009.01)
*H04W 36/00* (2009.01)

(52) U.S. Cl.
CPC .............. *H04L 65/80* (2013.01); *H04L 67/02* (2013.01); *H04W 36/0007* (2018.08); *H04W 36/06* (2013.01)

(58) Field of Classification Search
CPC .. H04W 88/182; H04W 16/26; H04W 84/047
See application file for complete search history.

(56) References Cited

U.S. PATENT DOCUMENTS

| | | |
|---|---|---|
| 2010/0110960 A1 | 5/2010 | Kim et al. |
| 2010/0317283 A1 | 12/2010 | Wu |
| 2013/0294316 A1* | 11/2013 | Amerga ................... H04W 4/06 370/312 |
| 2013/0336173 A1 | 12/2013 | Mandil et al. |
| 2014/0185455 A1* | 7/2014 | Balasubramanian ... H04W 4/06 370/241 |
| 2014/0241229 A1 | 8/2014 | Bertorelle et al. |

FOREIGN PATENT DOCUMENTS

| | | | | |
|---|---|---|---|---|
| WO | 2013022470 A1 | 2/2013 | | |
| WO | WO 2013022470 A1 * | 2/2013 | ............ | H04W 56/00 |
| WO | WO-2013022470 A1 * | 2/2013 | ............ | H04W 56/00 |
| WO | 2013112479 A1 | 8/2013 | | |

\* cited by examiner

Prior Art

Prior Art

HYBRID POCKET ROUTER

BACKGROUND

Field

The present disclosure relates generally to communication systems, and more particularly, to a split MBMS receiver architecture.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus for wireless communication are provided. The apparatus may be an MBMS receiver device. The MBMS receiver device receives at least one packet associated with an MBMS service. A configuration for providing the at least one packet to a UE is determined. The configuration may be one of a plurality of different configurations. The plurality of configurations may include at least a first configuration and a second configuration. The MBMS receiver device processes the received at least one packet based on the configuration. To process the received at least one packet, the MBMS receiver device may decode and error correct the at least one packet and prepare to send the decoded and error corrected packet when the configuration is the first configuration, and prepare to send the at least one packet un-decoded and without error correction when the configuration is the second configuration. The MBMS receiver device sends the processed at least one packet to the UE based on the configuration.

In another aspect of the disclosure, a method, a computer program product, and an apparatus for wireless communication are provided. The apparatus may be a UE. The UE receives an MBMS service from an MBMS receiver device under a first configuration. The UE may send a request to the MBMS receiver device to switch to receive the MBMS service under a second configuration. The UE receives the MBMS service from the MBMS receiver device under the second configuration.

DETAILED DESCRIPTION

Figure 1:
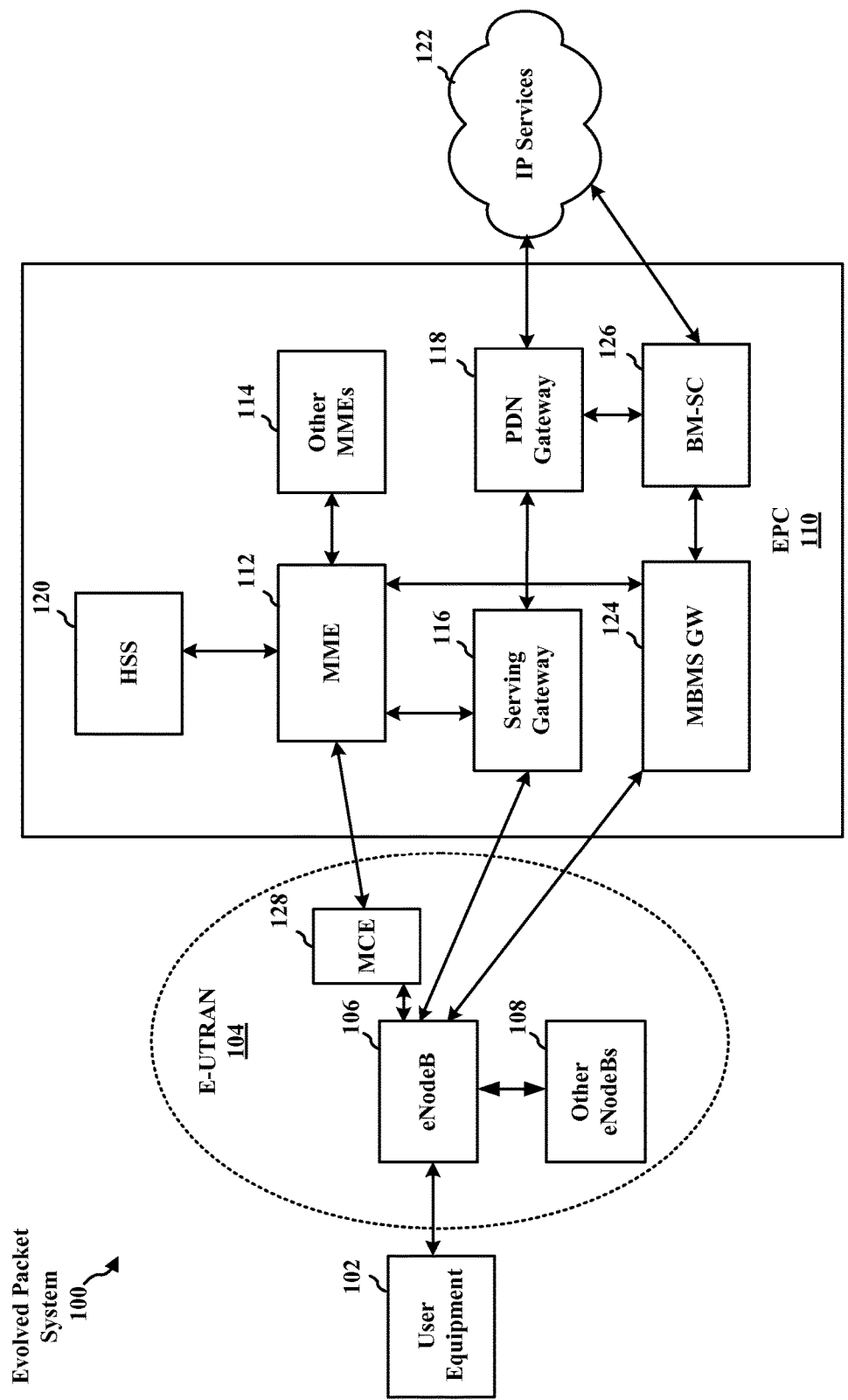
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a Packet Switch Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
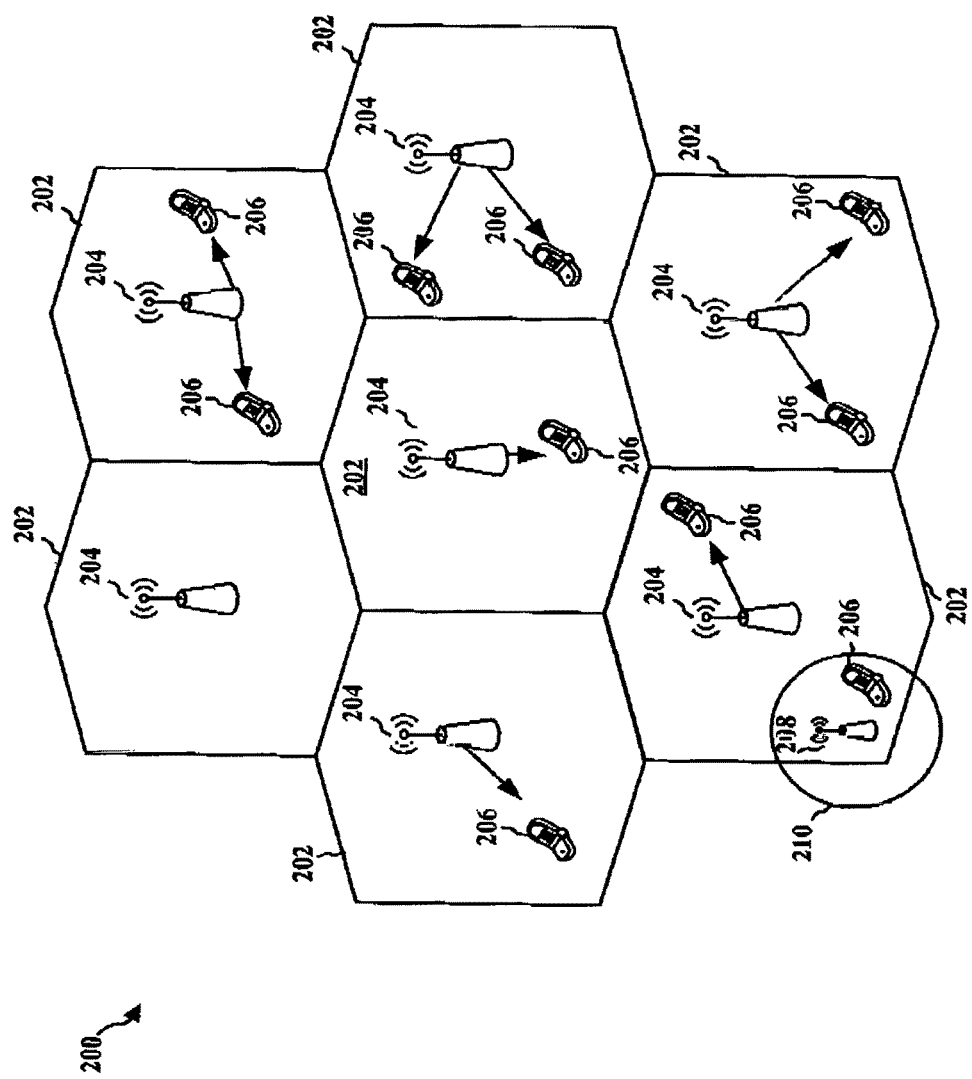
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving a particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (Wi-MAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
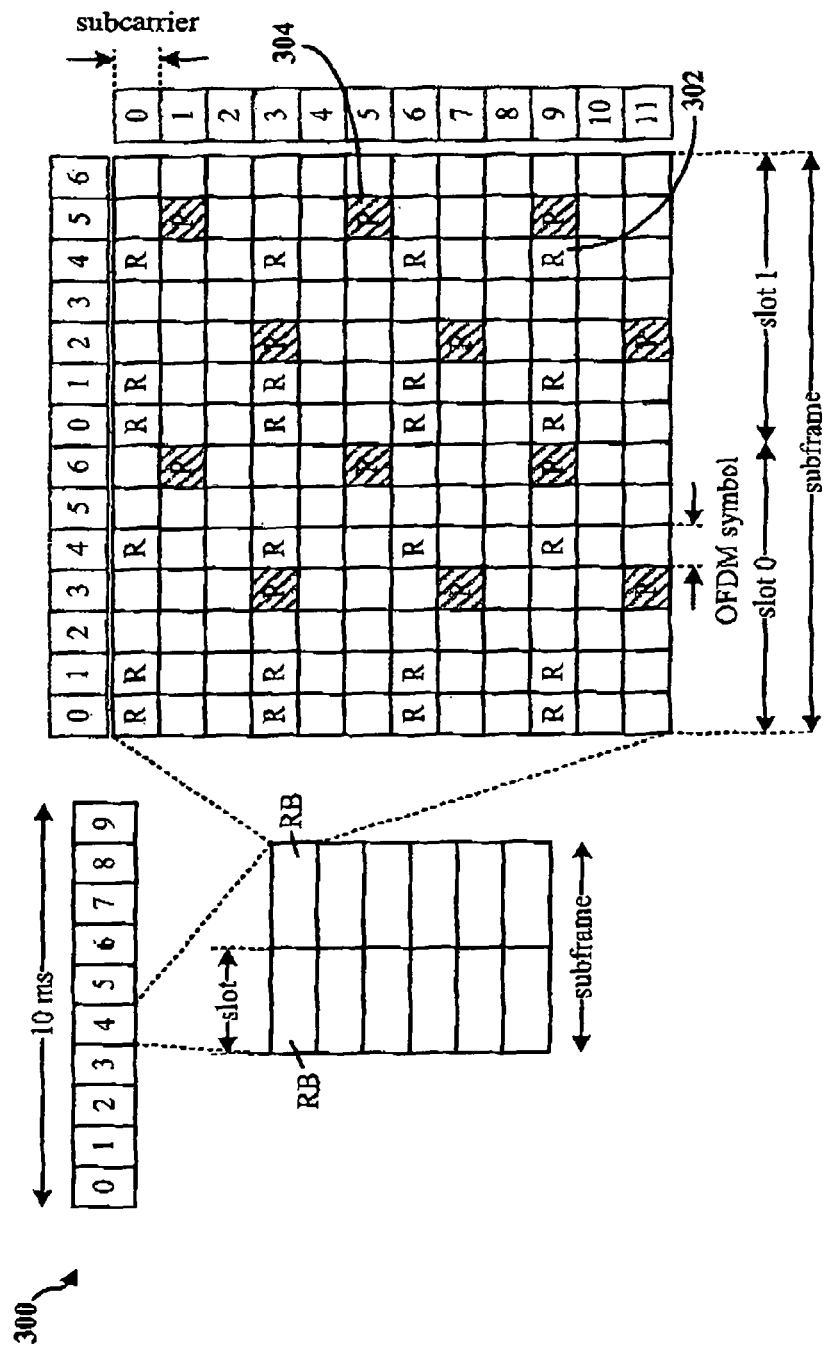
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
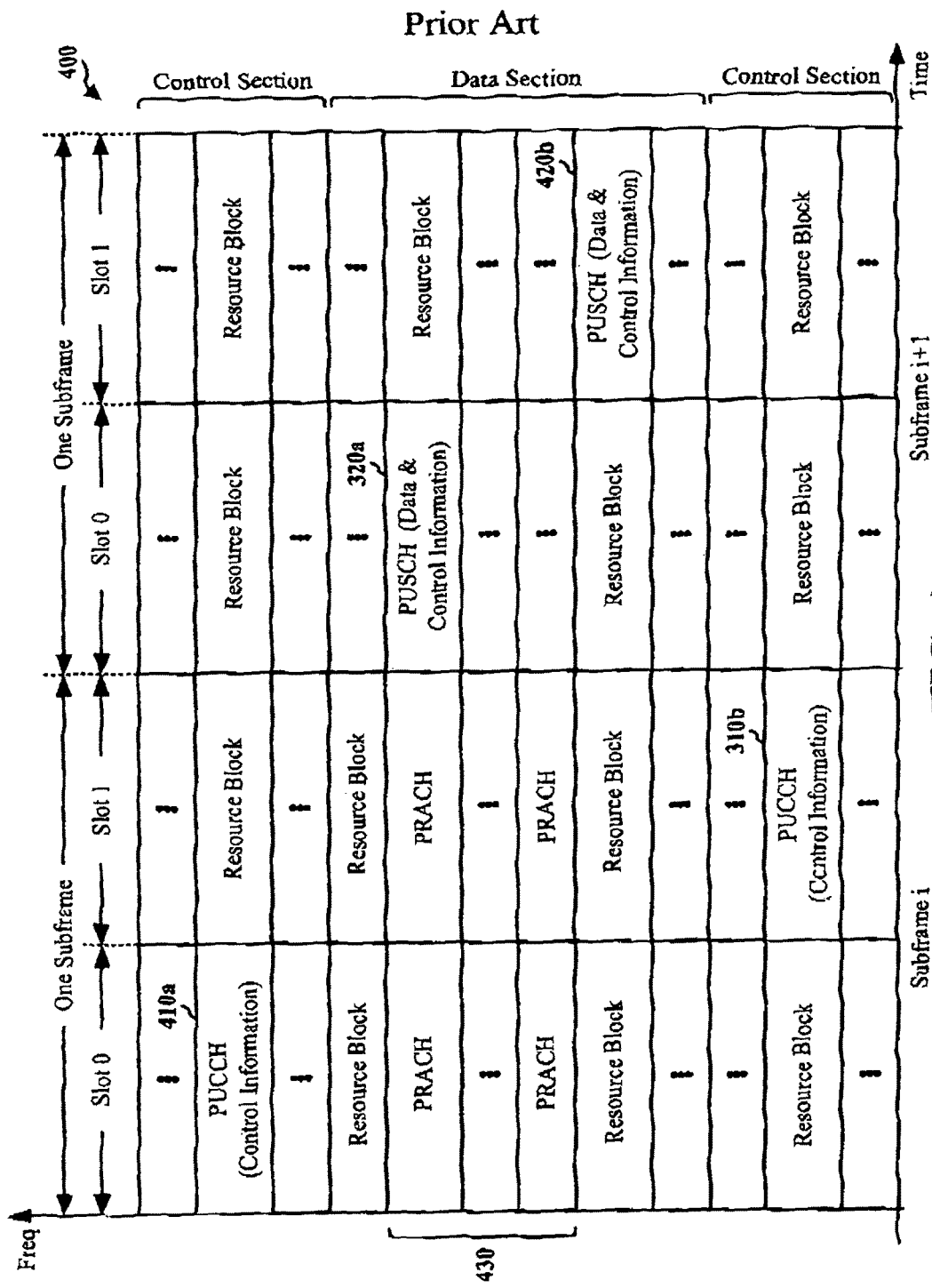
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410*a*, 410*b* in the control section to transmit control information to an eNB. The UE may also be assigned resource blocks 420*a*, 420*b* in the data section to transmit data to the eNB. The UE may transmit control information in a physical UL control channel (PUCCH) on the assigned resource blocks in the control section. The UE may transmit data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/ signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make a single PRACH attempt per frame (10 ms).

Figure 5:
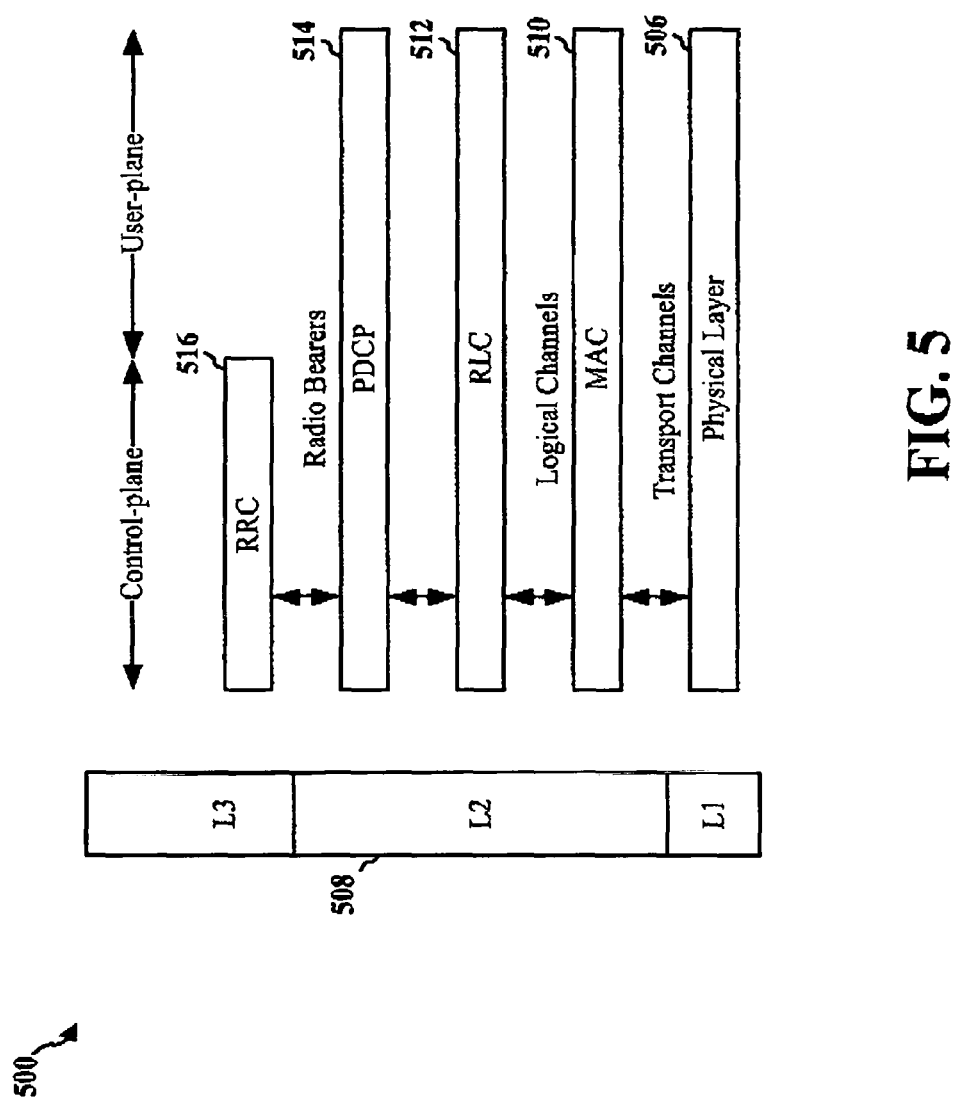
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
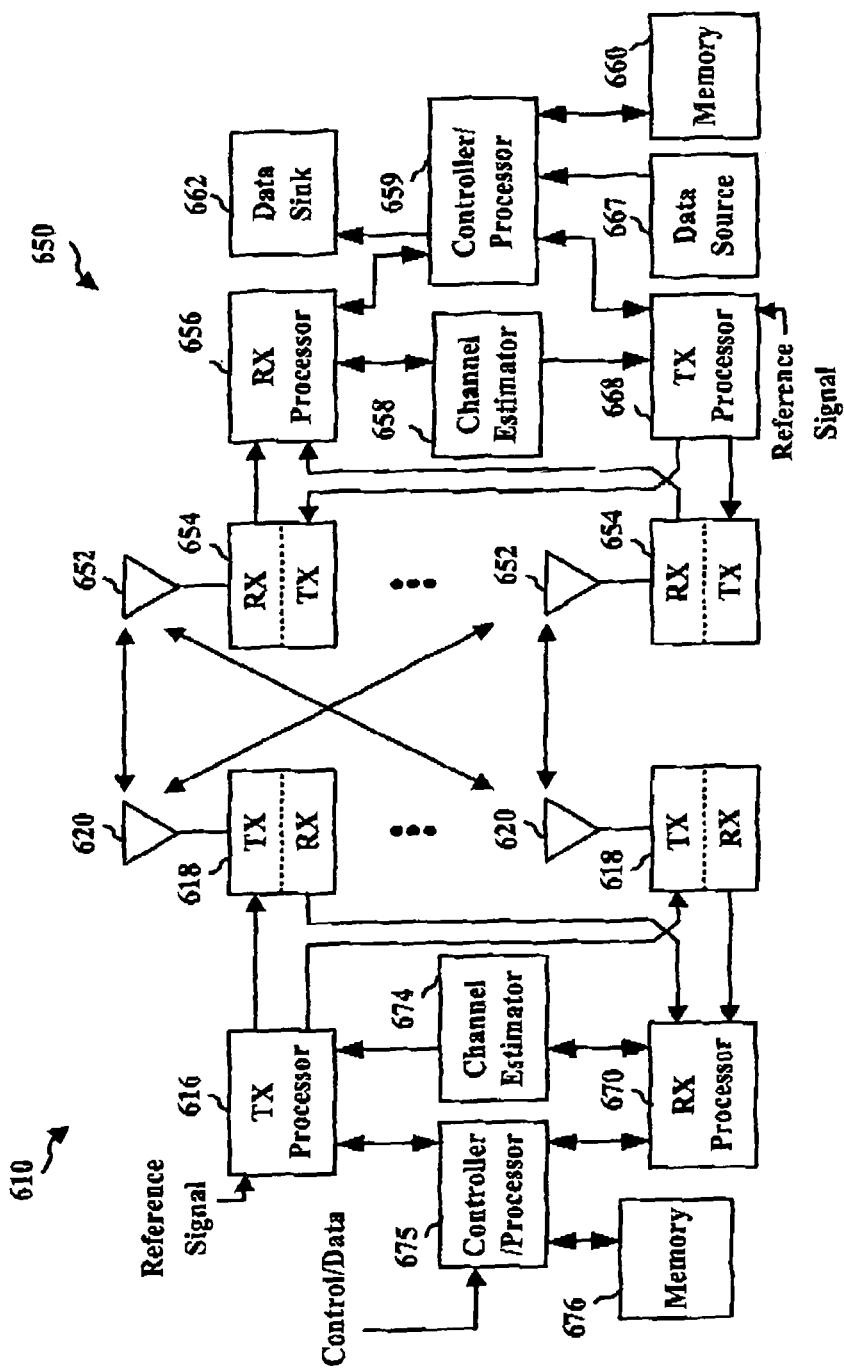
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7B:
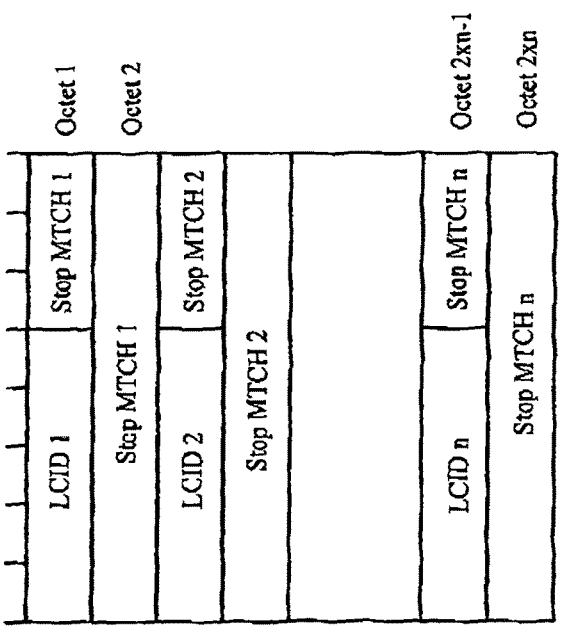
FIG. 7B is a diagram illustrating a format of a Multicast Channel Scheduling Information Media Access Control control element.
Figure 7A:
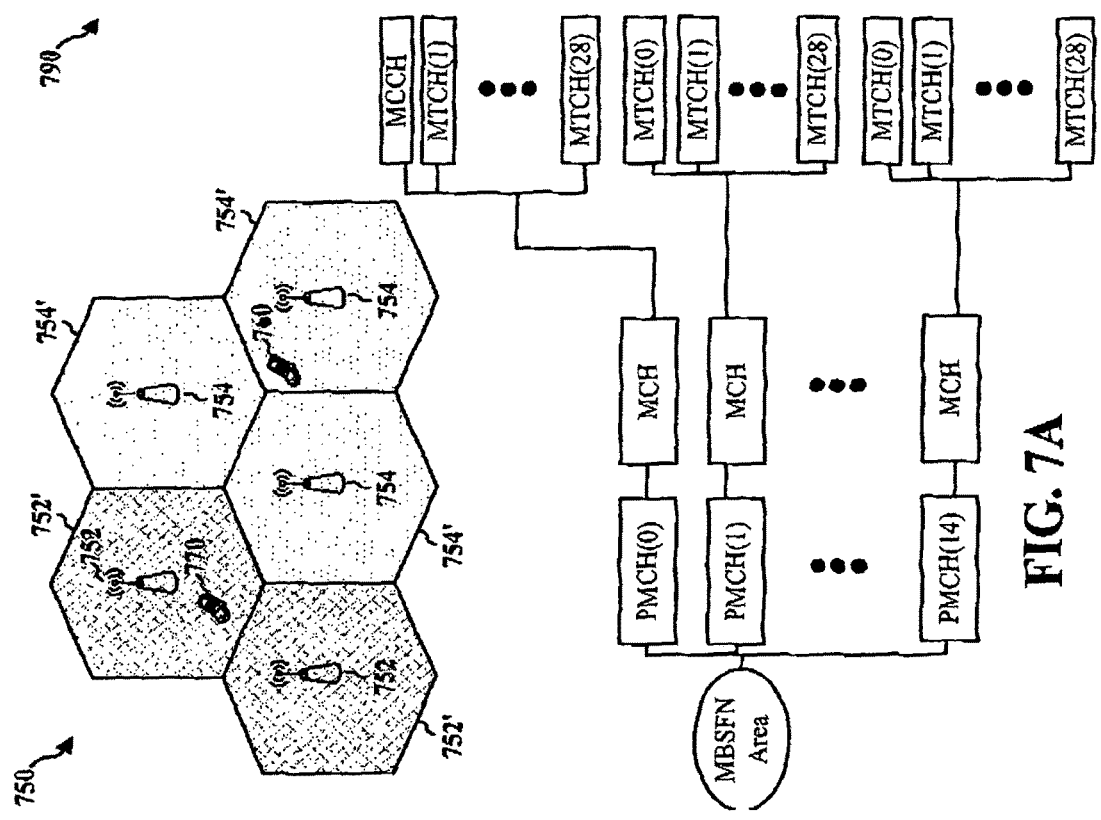
FIG. 7A is a diagram illustrating an example of an evolved Multimedia Broadcast Multicast Service channel configuration in a Multicast Broadcast Single Frequency Network.

FIG. 7A is a diagram 750 illustrating an example of an evolved MBMS (eMBMS) channel configuration in an MBSFN. The eNBs 752 in cells 752' may form a first MBSFN area and the eNBs 754 in cells 754' may form a second MBSFN area. The eNBs 752, 754 may each be associated with other MBSFN areas, for example, up to a total of eight MBSFN areas. A cell within an MBSFN area may be designated a reserved cell. Reserved cells do not provide multicast/broadcast content, but are time-synchronized to the cells 752', 754' and may have restricted power on MBSFN resources in order to limit interference to the MBSFN areas. Each eNB in an MBSFN area synchronously transmits the same eMBMS control information and data. Each area may support broadcast, multicast, and unicast services. A unicast service is a service intended for a specific user, e.g., a voice call. A multicast service is a service that may be received by a group of users, e.g., a subscription video service. A broadcast service is a service that may be received by all users, e.g., a news broadcast. Referring to FIG. 7A, the first MBSFN area may support a first eMBMS broadcast service, such as by providing a particular news broadcast to UE 770. The second MBSFN area may support a second eMBMS broadcast service, such as by providing a different news broadcast to UE 760. Each MBSFN area supports one or more physical multicast channels (PMCH) (e.g., 15 PMCHs). Each PMCH corresponds to a multicast channel (MCH). Each MCH can multiplex a plurality (e.g., 29) of multicast logical channels. Each MBSFN area may have one multicast control channel (MCCH). As such, one MCH may multiplex one MCCH and a plurality of multicast traffic channels (MTCHs) and the remaining MCHs may multiplex a plurality of MTCHs.

A UE can camp on an LTE cell to discover the availability of eMBMS service access and a corresponding access stratum configuration. Initially, the UE may acquire a system information block (SIB) 13 (SIB13). Subsequently, based on the SIB13, the UE may acquire an MBSFN Area Configuration message on an MCCH. Subsequently, based on the MBSFN Area Configuration message, the UE may acquire an MCH scheduling information (MSI) MAC control element. The SIB13 may include (1) an MBSFN area identifier of each MBSFN area supported by the cell; (2) information for acquiring the MCCH such as an MCCH repetition period (e.g., 32, 64, . . . , 256 frames), an MCCH offset (e.g., 0, 1, . . . , 10 frames), an MCCH modification period (e.g., 512, 1024 frames), a signaling modulation and coding scheme (MCS), subframe allocation information indicating which subframes of the radio frame as indicated by repetition period and offset can transmit MCCH; and (3) an MCCH change notification configuration. There is one MBSFN Area Configuration message for each MBSFN area. The MBSFN Area Configuration message may indicate (1) a temporary mobile group identity (TMGI) and an optional session identifier of each MTCH identified by a logical channel identifier within the PMCH, and (2) allocated resources (i.e., radio frames and subframes) for transmitting each PMCH of the MBSFN area and the allocation period (e.g., 4, 8, . . . , 256 frames) of the allocated resources for all the PMCHs in the area, and (3) an MCH scheduling period (MSP) (e.g., 8, 16, 32, . . . , or 1024 radio frames) over which the MSI MAC control element is transmitted.

FIG. 7B is a diagram 790 illustrating the format of an MSI MAC control element. The MSI MAC control element may be sent once each MSP. The MSI MAC control element may be sent in the first subframe of each scheduling period of the PMCH. The MSI MAC control element can indicate the stop frame and subframe of each MTCH within the PMCH. There may be one MSI per PMCH per MBSFN area.

A split MBMS receiver architecture is an arrangement in which one or more client devices receive MBMS service through an MBMS receiver device. The split MBMS receiver architecture may provide access to MBMS content to low end client devices that cannot directly access MBMS services. The split MBMS receiver architecture may allow a high end client device to offload processing of the MBMS content when resources of the high end client device are being utilized by other applications running on the high end client device. The split MBMS receiver architecture may also allow one MBMS service connection or subscription to be shared by multiple client devices.

In a split MBMS receiver architecture, an MBMS receiver component (e.g., lower layers such as physical layer and L2 layer, Software enabled Access Point, or Outside Data Unit) may be present on one device, while the service layer and/or end client of the MBMS service may be on one or more client devices (e.g., one or more UEs). The device containing the MBMS receiver component is an MBMS receiver device, which may be a UE. The MBMS receiver device receives MBMS content and forwards the received MBMS content to the client devices. The client devices consume MBMS content from the MBMS receiver device. Each client device may run a full version of MBMS middleware that performs all the functionality (e.g., decoding packets, error correction etc.) to enable the consumption of MBMS content.

Client devices may be categorized into two groups: high end client devices and low end client devices. A high end client device may have superior capabilities compared to a low end client device in terms of processor type, processor speed, memory and storage capacity, display density/resolution, MBMS functionality, and/or other wireless communication functionality.

A full version of MBMS middleware may be able to consume (e.g., decode and/or error correct) raw MBMS content directly. In one configuration, raw MBMS content may be MBMS content that remains unaltered after the MBMS content is received from the LTE eMBMS network. In one configuration, raw MBMS content may be generated by the LTE modem that receives eMBMS signal from the LTE eMBMS network. In such configuration, the LTE modem processes the received eMBMS signal (e.g., by demodulating the eMBMS signal or by recovering IP/UDP packets after demodulation) to generate raw MBMS content. In one configuration, raw MBMS content contains packets (e.g., IP/UDP packets) that maintain the same logical form (e.g., neither decoded nor error corrected) after the packets are recovered by the LTE modem. In an environment (e.g., home) that utilizes the split MBMS receiver architecture, not all client devices may be capable of running the full version of MBMS middleware. For example, low end client devices (e.g., low end UEs) with limited system resources (e.g., memory and non-volatile storage space) may not be able to run the full version of MBMS middleware. In that case, the low end client devices will not be able to consume raw MBMS content received from the MBMS receiver device. In order to support low end client devices, the full version of MBMS middleware may be run in the MBMS receiver device with each low end client device running a thin MBMS client. A thin MBMS client running in a client device may be able to receive and display processed MBMS content (e.g., MBMS content processed by a full version of MBMS middleware running in the MBMS receiver device), but may not be able to process and to display raw MBMS content. However, running the full version of MBMS middleware in the MBMS receiver device may not lead to optimal user experience (e.g., the fastest streaming speed, the highest audio/video quality) for a high end client device (e.g., high end UEs), which may have more capability than the MBMS receiver device in running the middleware. Therefore, a solution to achieve optimal user experience for both high end and low end client devices in the split MBMS receiver architecture is desirable.

A high end client device in the split MBMS receiver architecture may be MBMS capable (e.g., capable of obtaining MBMS content directly from an eNB). However, the MBMS capable high end client device may choose to get content from an MBMS receiver device because of wireless service subscription limitations/restrictions and/or ease of use. For example, the MBMS receiver device may receive the MBMS service from a wireless service provider to which the MBMS capable high end client device does not have a subscription. Instead of subscribing to the wireless service provider (e.g., by paying a fee), the MBMS capable high end client device may choose to receive the MBMS service from the MBMS receiver device to avoid the delay and/or cost of getting a new subscription. An MBMS receiver device of the split MBMS receiver architecture can enable client devices of differing capabilities and subscriptions to share the MBMS subscription of the MBMS receiver device.

In one configuration, a hybrid model for the split MBMS receiver architecture is used to provide MBMS services. In the hybrid model, the MBMS receiver device may run an MBMS service layer (also referred to herein as native MBMS middleware), which may be a full version of MBMS middleware and serve low end client devices that run a thin MBMS client. The MBMS receiver device may also support high end client devices in which the MBMS Service layer (also referred to herein as remote MBMS middleware) is running in the high end client devices. The remote MBMS middleware may be a full version of MBMS middleware that uses the full capability of a high end client device. The MBMS receiver device may provide MBMS data to client devices (e.g., end user devices) of differing capabilities: the smart MBMS client (e.g., remote MBMS middleware running in high end client device) and the thin MBMS client (e.g., running in low end client device). The MBMS receive device provides MBMS data to the thin MBMS client by running a local native MBMS service layer (e.g., native MBMS middleware) locally in the MBMS receiver device. The local native MBMS service layer provides processed (e.g., decoded and error corrected) MBMS data to thin MBMS clients to enable low end client devices to receive MBMS service via thin MBMS clients.

Figure 8:
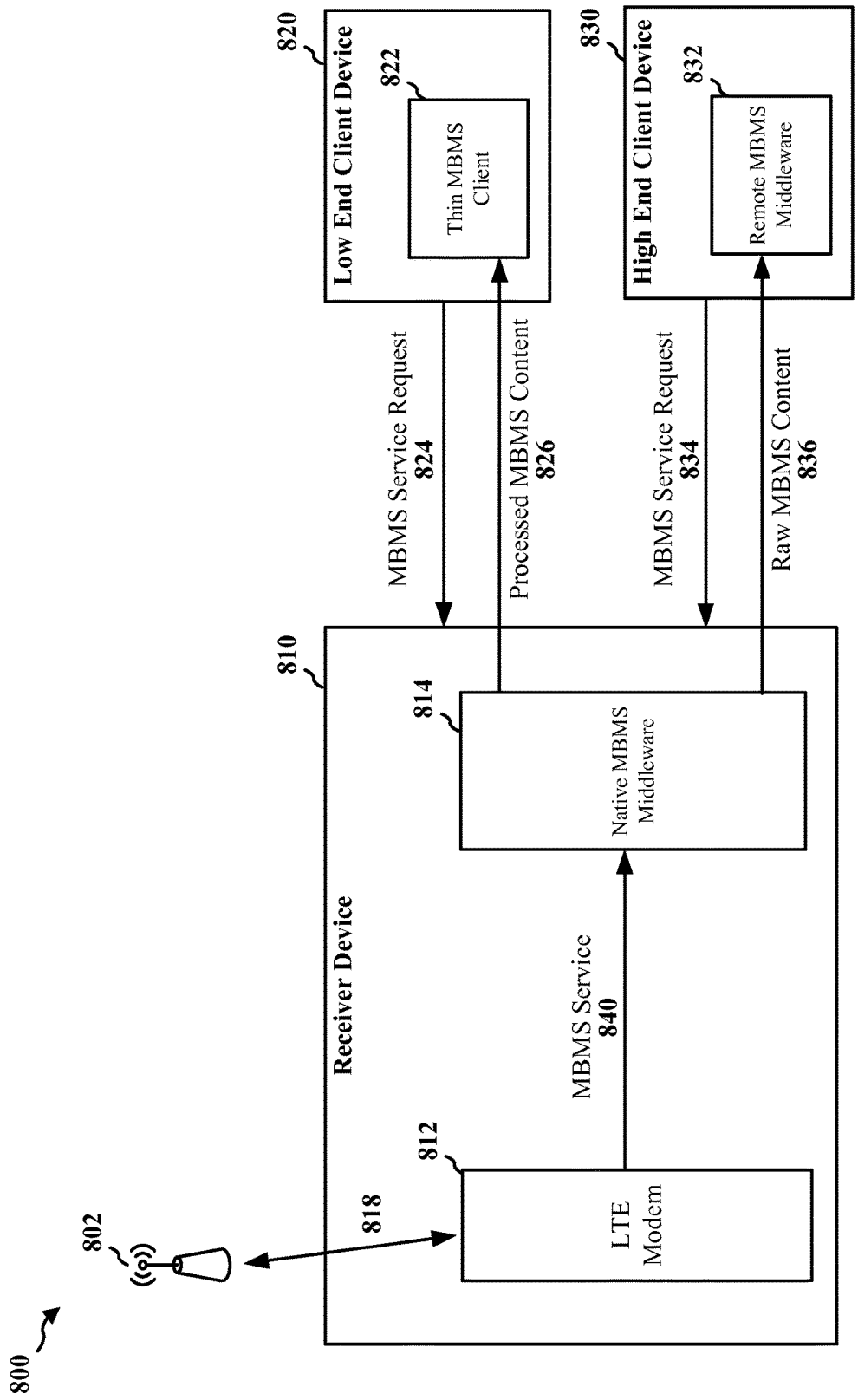
FIG. 8 is a diagram illustrating an example of the hybrid model for a split MBMS receiver architecture.

FIG. 8 is a diagram 800 illustrating an example of the hybrid model for a split

MBMS receiver architecture. As shown in FIG. 8, a receiver device 810 may include an LTE modem 812 and native MBMS middleware 814 as a local native MBMS service layer. A low end client device 820 may include a thin MBMS client 822. The high end client device 830 may include remote MBMS middleware 832. In one configuration, one or more of the receiver device 810, the low end client device 820, and the high end client device 830 may be a UE.

The receiver device 810 may receive a request 824 for an MBMS service from the low end client device 820. The receiver device 810 may also receive a request 834 for MBMS service from the high end client device 830. The MBMS service requests 824 and 834 may happen concurrently or separately. Therefore, the receiver device 810 may serve the low end client device 820 and the high end client device 830 concurrently, or may serve one of the low end client device 820 and the high end client device 830 at a time. In response to the MBMS service request(s), if the receiver device 810 is able to handle the MBMS service request(s), the receiver device 810 communicates 818, through the LTE modem 812, with the base station 802 to obtain the particular MBMS service(s). The LTE modem 812 then forwards the received MBMS service 840 to the native MBMS middleware 814. In one configuration, the LTE modem 812 forwards MBMS service to the native MBMS middleware 814 only when necessary to support a particular client device. For example, the LTE modem 812 may forward MBMS service 840 to the native MBMS middleware 814 only when a connected low end client device (e.g., 820) or high end client device (e.g., 830) needs to be supported.

The native MBMS middleware 814 may be a full version of MBMS middleware that processes the received MBMS service 840. In one configuration, the native MBMS middleware 814 processes the received MBMS service 840 by decoding the received packets (e.g., IP/UDP packets) and/or performing error correction on the received packets. The native MBMS middleware 814 sends the processed MBMS content 826 to the thin MBMS client 822 of the low end client device 820. In one configuration, the processed MBMS content 826 may be in Dynamic Adaptive Streaming over HTTP (DASH) format. In such configuration, the native MBMS middleware 814 may host a DASH server, and the thin MBMS client 822 may include a DASH enabled media player for playing back the MBMS content 826 in DASH format. In one configuration, the processed MBMS content 826 may be a decoded file. In such configuration, the thin MBMS client 822 may include a file delivery user interface for receiving the decoded file.

The native MBMS middleware 814 may abstain from processing the received MBMS service 840, which may contain raw MBMS content. In one configuration, raw MBMS content may be generated by the LTE modem 812. In such configuration, the LTE modem 812 processes received eMBMS signal (e.g., by demodulating the eMBMS signal or by recovering IP/UDP packets after demodulation) to generate raw MBMS content. In one configuration, the native MBMS middleware 814 does not alter the logical form of the received raw MBMS content (e.g., by abstaining from decoding and/or error correcting the raw MBMS content). In one configuration, the native MBMS middleware 814 sends raw MBMS content 836 to the remote MBMS middleware 832 of the high end client device 830. In one configuration, the raw MBMS content 836 may be unaltered content of the raw MBMS content contained in the MBMS service 840. In one configuration, the raw MBMS content 836 may contain packets that are neither decoded nor error corrected. In such configuration, the native MBMS middleware 814 may stream the raw MBMS content 836 to the remote MBMS middleware 832 through a User Datagram Protocol (UDP) tunnel or IP tunnel. In such configuration, the raw MBMS content 836 may be put in a new envelope in order to be transmitted through the UDP/IP tunnel. In one configuration, the remote MBMS middleware 832 may be a full version of MBMS middleware. In such configuration, the remote MBMS middleware 832 may decode and/or error correct the received packets. In one configuration, the remote MBMS middleware 832 may convert the MBMS content into DASH format. In such configuration, the remote MBMS middleware 832 may host a DASH server and may enable playing of DASH content through a DASH enabled media player.

In response to an MBMS service request from a UE (e.g., the low end client device 820 or the high end client device 830), the receiver device 810 may determine a configuration for forwarding the requested MBMS service to the UE. In one aspect, there are two configurations for forwarding the MBMS service to choose from: a configuration using the native MBMS middleware 814 to process the content of the MBMS service and to send the processed MBMS content to the UE, or a configuration using the native MBMS middleware 814 to forward unaltered content of the MBMS service to the UE.

The receiver device 810 may determine the configuration for forwarding the requested MBMS service to the UE based on the received MBMS service request from the UE. In such a configuration, the UE may send the MBMS service request to different ports of the receiver device 810 to indicate the configuration for forwarding the MBMS service to the UE. For example, the receiver device 810 may have ports A and B (not shown). Port A is for receiving an MBMS service request from a UE to indicate that the receiver device 810 should use the native MBMS middleware 814 to process the content of the MBMS service and to send the processed MBMS content to the UE. Port B is for receiving an MBMS service request from a UE to indicate that the receiver device 810 should use the native MBMS middleware 814 to forward unaltered content of the MBMS service to the UE. The low end client device 820 may send the MBMS service request 824 to port A of the receiver device 810. The high end client device 830 may send the MBMS service request 834 to either port A or port B of the receiver device 810.

Figure 9:
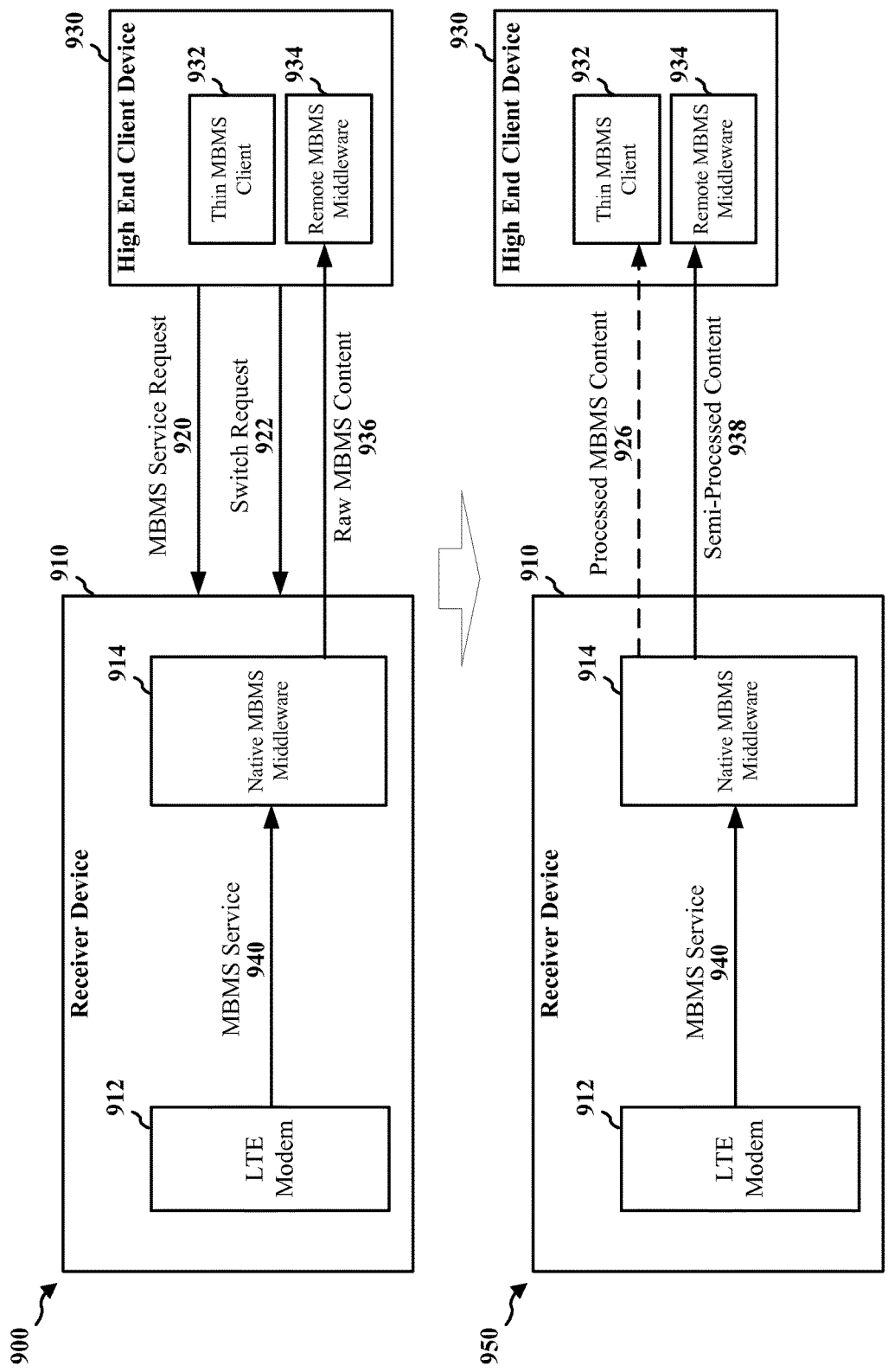
FIG. 9 is diagrams illustrating an example of a high end client device that offloads some or all work performed by its remote MBMS middleware to a receiver device.

In one configuration, a high end client device may offload some or all of the work performed by the remote MBMS middleware of the high end client device to the MBMS receiver device to achieve optimal user experience (e.g., faster streaming and higher audio/video quality). FIG. 9 are diagrams 900 and 950 illustrating an example of a high end client device 930 that offloads some or all of the work performed by the high end client device's remote MBMS middleware 934 to the receiver device 910. As shown in FIG. 9, the receiver device 910 may include an LTE modem 912 and a native MBMS middleware 914. The high end client device 930 may include a thin MBMS client 932 and the remote MBMS middleware 934. In one configuration, one or both of the receiver device 910 and the high end client device 930 may be a UE.

As shown in diagram 900, the receiver device 910 may receive a request 920 for MBMS service from the high end client device 930. In response to the MBMS service request 920, if the receiver device 910 is able to handle the MBMS service request, the receiver device 910 communicates, through the LTE modem 912, with a base station to obtain the requested MBMS service. The receiver device 910 may determine a configuration associated with the high end client device 930 for receiving the MBMS service. In one configuration, the high end client device 930 may indicate to the receiver device 910, e.g., through the MBMS service request 920, that the high end client device 930 wants to receive unaltered content of the MBMS service through the native MBMS middleware 914 of the receiver device 910. In one configuration, the MBMS service request 920 is a device-to-device message that is sent to a particular port of the receiver device 910. The LTE modem 912 then forwards the received MBMS service 940 to the native MBMS middleware 914. In one configuration, the MBMS service 940 may contain raw MBMS content. In one configuration, raw MBMS content may be generated by the LTE modem 912. In such configuration, the LTE modem 912 processes received eMBMS signal (e.g., by demodulating the eMBMS signal or by recovering IP/UDP packets after demodulation) to generate raw MBMS content.

In one configuration, the native MBMS middleware 914 does not alter the logical form of the received raw MBMS content (e.g., by abstaining from decoding and/or error correcting the raw MBMS content). In one configuration, the native MBMS middleware 914 sends raw MBMS content 936 to the remote MBMS middleware 934 of the high end client device 930. In one configuration, the raw MBMS content 936 may be unaltered content of the raw MBMS content contained in the MBMS service 940. In one configuration, the raw MBMS content 936 may contain recovered UDP/IP packets that are neither decoded nor error corrected. In such configuration, the native MBMS middleware 914 may stream the raw MBMS content 936 to the remote MBMS middleware 934 through a UDP tunnel or IP tunnel. In such configuration, the raw MBMS content 936 may be put in a new envelope in order to be transmitted through the UDP/IP tunnel. In one configuration, the remote MBMS middleware 934 may be a full version of MBMS middleware. In such configuration, the remote MBMS middleware 934 may decode and/or error correct the received packets. In one configuration, the remote MBMS middleware 934 may convert the received raw MBMS content 936 into DASH format. In such configuration, the remote MBMS middleware 934 may host a DASH server and may enable playing of DASH content through a DASH enabled media player.

When receiving the MBMS service using the remote MBMS middleware 934, the high end client device 930 may decide to offload one or more functions performed by the remote MBMS middleware 934 to the receiver device 910. In one configuration, the functions that may be offloaded to the receiver device may include one or more of file delivery (e.g., monitoring any downloads available through eMBMS broadcast and sending the downloaded file to clients), modem decoding (e.g., decoding IP/UDP packets), and FEC decoding (e.g., error correcting IP/UDP packets). The high end client device 930 then sends a switch request 922 to the receiver device 910. In one configuration, the switch request 922 may specify which functions the high end client device 930 wants to offload to the receiver device 910. In one configuration, the decision regarding offloading may be triggered by at least one of low memory (e.g., caused by high memory utilization by other applications running on the client device), high CPU usage, low battery, low storage, non availability of a FEC decoding scheme used by the MBMS service, or non availability of support for a streaming protocol (e.g., Real-time Transport Protocol (RTP) based) at the high end client device 930.

As shown in diagram 950, in response to the switch request 922, the native MBMS middleware 914 processes the receive MBMS service 940 by performing the functions offloaded by the remote MBMS middleware 934 of the high end client device 930. The native MBMS middleware 914 sends the semi-processed MBMS content 938 to the remote MBMS middleware 934 of the high end client device 930. In one configuration, the switch request 922 may indicate that the high end client device wants to offload all functions performed by the remote MBMS middleware 934 to the receiver device 910. In such configuration, the native MBMS middleware 914 sends processed MBMS content 926 to the thin MBMS client 932 of the high end client device 930.

Figure 10:
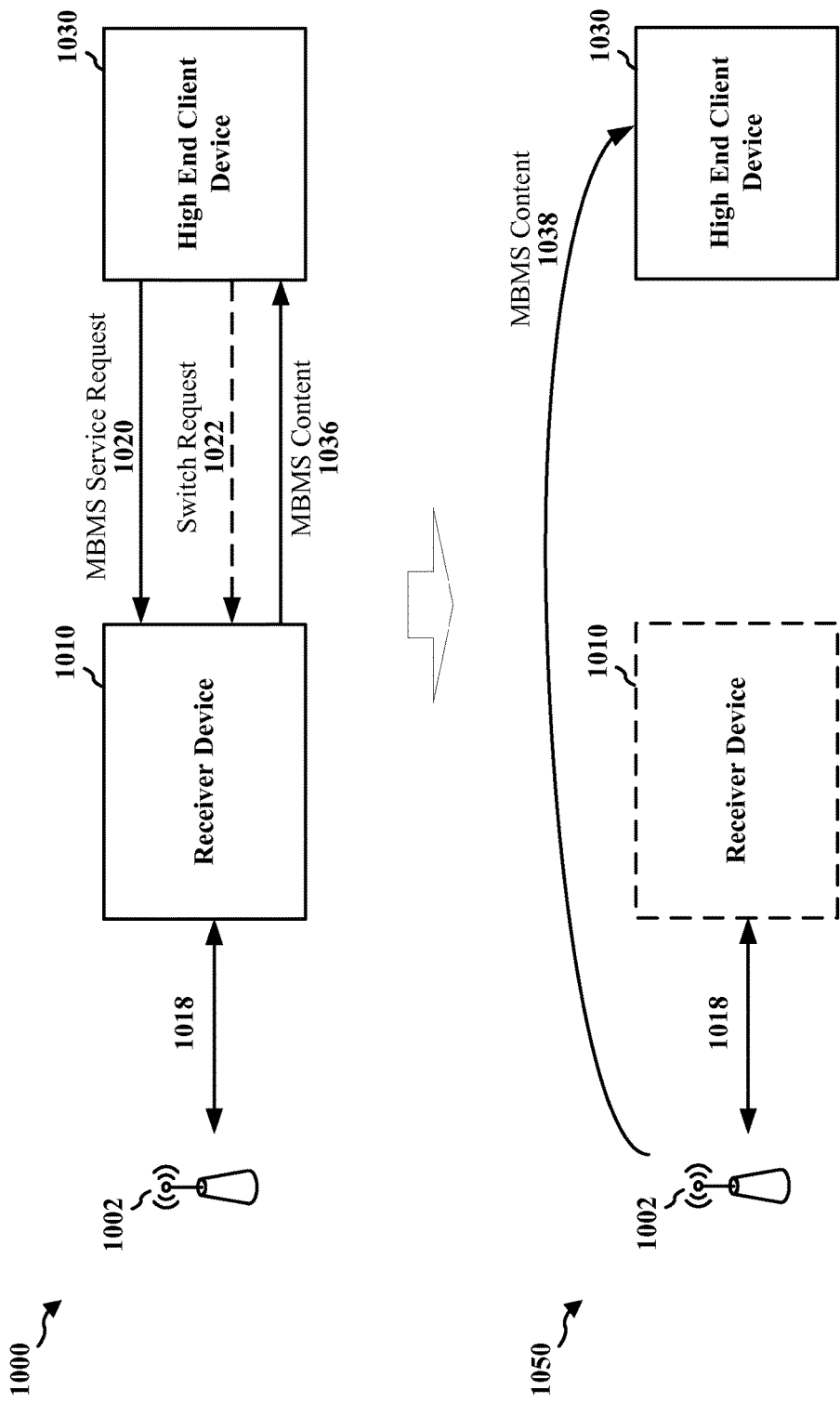
FIG. 10 are diagrams and illustrating an example of a high end client device that switches from receiving an MBMS service through a receiver device to receiving the MBMS service directly from a base station.

Diagrams 1000 and 1050 of FIG. 10 illustrate an example of a high end client device 1030 that switches from receiving an MBMS service through a receiver device 1010 to receiving the MBMS service directly from a base station 1002. As shown in diagram 1000, the receiver device 1010 may receive a request 1020 for MBMS service from the high end client device 1030. In response to the MBMS service request 1020, if the receiver device 1010 is able to handle the MBMS service request, the receiver device 1010 communicates 1018 with the base station 1002 to obtain the MBMS service. The receiver device 1010 then sends MBMS content 1036 to the high end client device 1030. The MBMS content may be processed MBMS content (e.g., the processed MBMS content 926) or raw MBMS content (e.g., the raw MBMS content 936).

When receiving the MBMS service through the receiver device 1010, the high end client device 1030 may decide to receive the MBMS service directly from the base station 1002 without involvement of the receiver device. The high end client device 1030 may optionally send a switch request 1022 to the receiver device 1010. In one configuration, the switch request 1022 may notify the receiver device 1010 that the high end client device 1030 is going to receive the MBMS service from the base station 1002 directly. In one configuration, the decision regarding the switch to receive the MBMS service directly from base station may be triggered by the high end client device 1030 moving outside of the communication range with the receiver device 1010, or by the receiver device 1010 being unavailable for any other reason, or by a user request. As shown in diagram 1050, after the switch, the high end client device 1030 receives MBMS content 1038 from the base station 1002 directly without the involvement of the receiver device 1010.

In one configuration, the high end client device 1030 may switch from receiving the MBMS service directly from the base station 1002 to receiving the MBMS service through the receiver device 1010. In one configuration, the decision regarding the switch to receive the MBMS service indirectly through the receiver device 1010 may be triggered by the high end client device 1030 moving within the communication range with the receiver device 1010 or by a user request.

Figure 11:
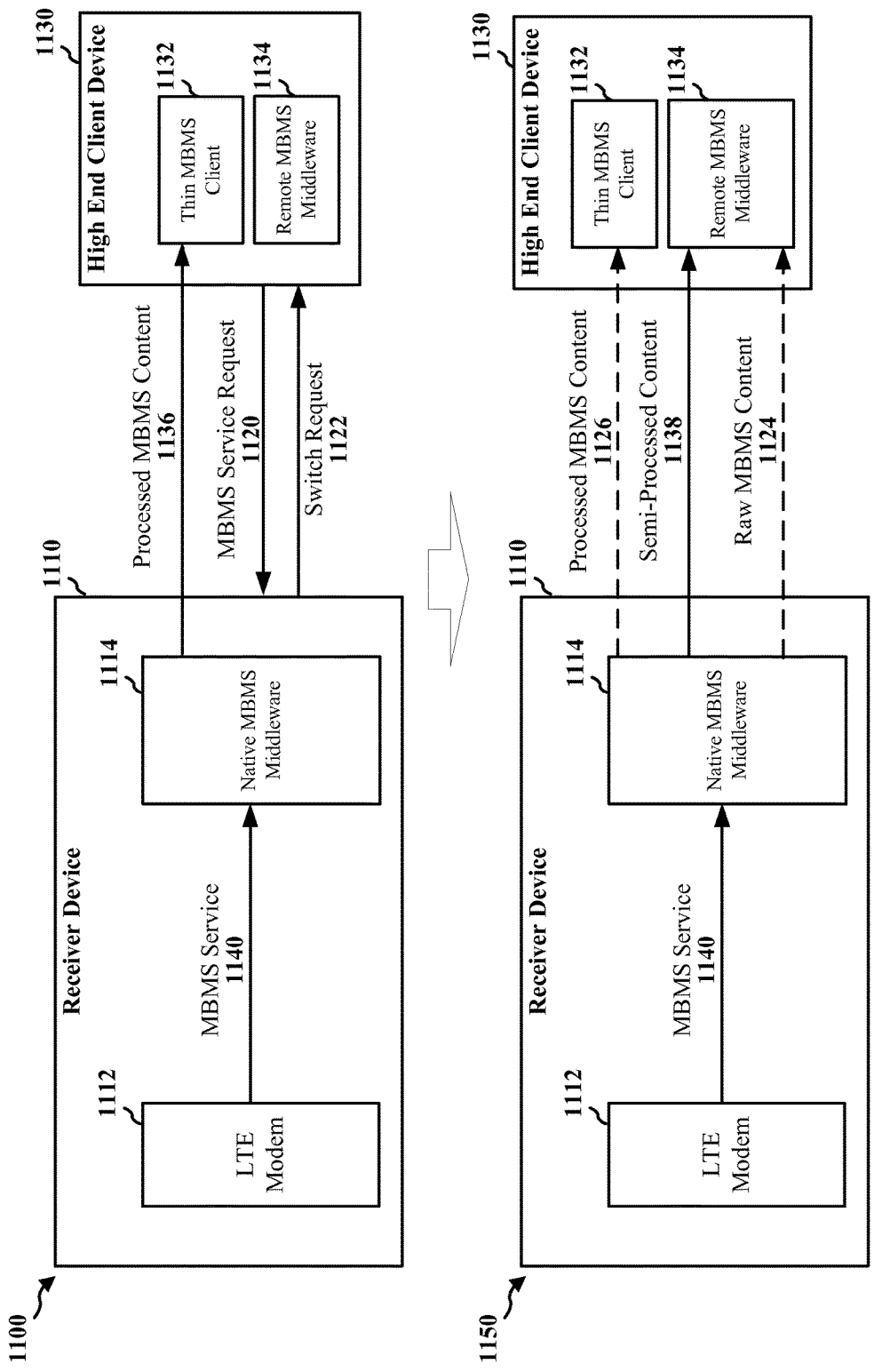
FIG. 11 are diagrams illustrating an example of a receiver device that offloads some or all work performed by its native MBMS middleware to a remote MBMS middleware of a high end client device.

In one configuration, an MBMS receiver device may offload some or all work performed by its native MBMS middleware to the remote MBMS middleware of a high end client device to achieve optimal user experience. FIG. 11 are diagrams 1100 and 1150 illustrating an example of a receiver device 1110 that offloads some or all work performed by its native MBMS middleware 1114 to a remote MBMS middleware 1134 of a high end client device 1130. As shown in FIG. 11, the receiver device 1110 may include an LTE modem 1112 and a native MBMS middleware 1114. The high end client device 1130 may include a thin MBMS client 1132 and the remote MBMS middleware 1134. In one configuration, one or both of the receiver device 1110 and the high end client device 1130 may be a UE.

As shown in diagram 1100, the receiver device 1110 may receive a request 1120 for MBMS service from the high end client device 1130. In response to the MBMS service request 1120, if the receiver device 1110 is able to handle the MBMS service request, the receiver device 1110 communicates, through the LTE modem 1112, with a base station to obtain the MBMS service. The receiver device 1110 may determine a configuration associated with the high end client device 1130 for receiving the MBMS service. In one configuration, the high end client device 1130 may indicate to the receiver device 1110, e.g., through the MBMS service request 1120, that the high end client device 1130 wants to act like a low end client device and receive the MBMS service through the native MBMS middleware 1114 of the receiver device 1110. The LTE modem 1112 then forwards the received MBMS service 1140 to the native MBMS middleware 1114.

In one configuration, the native MBMS middleware 1114 may be a full version of MBMS middleware that processes the received MBMS service 1140, e.g., by decoding the received packets (e.g., IP/UDP packets) and/or error correcting the received packets. In one configuration, the native MBMS middleware 1114 sends processed MBMS content 1136 to the thin MBMS client 1132 of the high end client device 1130. In one configuration, the processed MBMS content 1126 may be in DASH format. In such configuration, the native MBMS middleware 1114 may host a DASH server, and the thin MBMS client 1132 may include a DASH enabled media player for playing back the received processed MBMS content 1126 in DASH format. In one configuration, the processed MBMS content 1126 may be a decoded file. In such configuration, the thin MBMS client 1132 may include a file delivery user interface.

When forwarding the MBMS service using the native MBMS middleware 1114, the receiver device 1110 may decide to offload some or all functions performed by the native MBMS middleware 1114 to the remote MBMS middleware 1134 of the high end client device 1130. In one configuration, the functions that may be offloaded to the high end client device 1130 may include one or more of file delivery (e.g., monitoring any downloads available through eMBMS broadcast and sending the downloaded file to clients), modem decoding (e.g., decoding IP/UDP packets), and FEC decoding (e.g., error correcting IP/UDP packets). The receiver device 1110 then sends a switch request 1122 to the high end client device 1130. In one configuration, the switch request 1122 may specify which functions that the receiver device 1110 wants to offload to the high end client device 1130. In one configuration, the decision regarding offloading may be triggered by at least one of low memory, high CPU usage, low battery, low storage, service already decoded (e.g., remote MBMS middleware of a high end client device offloads the work to the receiver device 1110), non availability of FEC decoding schemes, or non availability of support for streaming protocol (e.g., RTP based) at the receiver device 1110.

As shown in diagram 1150, in response to the switch request 1122, if the high end client device 1130 accepts the switch request 1122, instead of receiving processed MBMS content 1136 from the native MBMS middleware 1114 at its thin MBMS client 1132, the high end client device 1130 receives semi-processed MBMS content 1138 from the native MBMS middleware 1114 of the receiver device 1110 at its remote MBMS middleware 1134. The native MBMS middleware 1114 generates the semi-processed MBMS content 1138 by performing the functions that are not offloaded to the high end client device 1130.

The remote MBMS middleware 1134 of the high end client device 1130 processes the received semi-processed MBMS content 1138 by performing the functions offloaded by the native MBMS middleware 1114 of the receiver device 1110. In one configuration, the switch request 1122 may indicate that the receiver device 1110 wants to offload all functions performed by the native MBMS middleware 1114 to the high end client device 1130. In such configuration, the LTE modem 1112 forwards the MBMS service 1140 to the native MBMS middleware 1114, which sends raw MBMS content 1124 to the remote MBMS middleware 1134 of the high end client device 1130. In one configuration, the MBMS service 1140 may contain raw MBMS content. In one configuration, raw MBMS content may be generated by the LTE modem 1112. In such configuration, the LTE modem 1112 processes received eMBMS signal (e.g., by demodulating the eMBMS signal or by recovering IP/UDP packets after demodulation) to generate raw MBMS content. In one configuration, the raw MBMS content 1124 may be unaltered content of the raw MBMS content contained in the MBMS service 1140. In one configuration, raw MBMS content 1124 contains packets (e.g., IP/UDP packets) that are neither decoded nor error corrected.

In one configuration, while receiving the semi-processed MBMS content 1138 from the native MBMS middleware 1114 of the receiver device 1110, the high end client device 1130 may concurrently receive at least one of the raw MBMS content 1124 or a processed MBMS content 1126 from the native MBMS middleware 1114. In one configuration, the high end client device 1130 may concurrently receive two or more of the processed MBMS content 1126, semi-processed MBMS content 1138, or raw MBMS content 1124 from the receiver device 1110.

Figure 12:
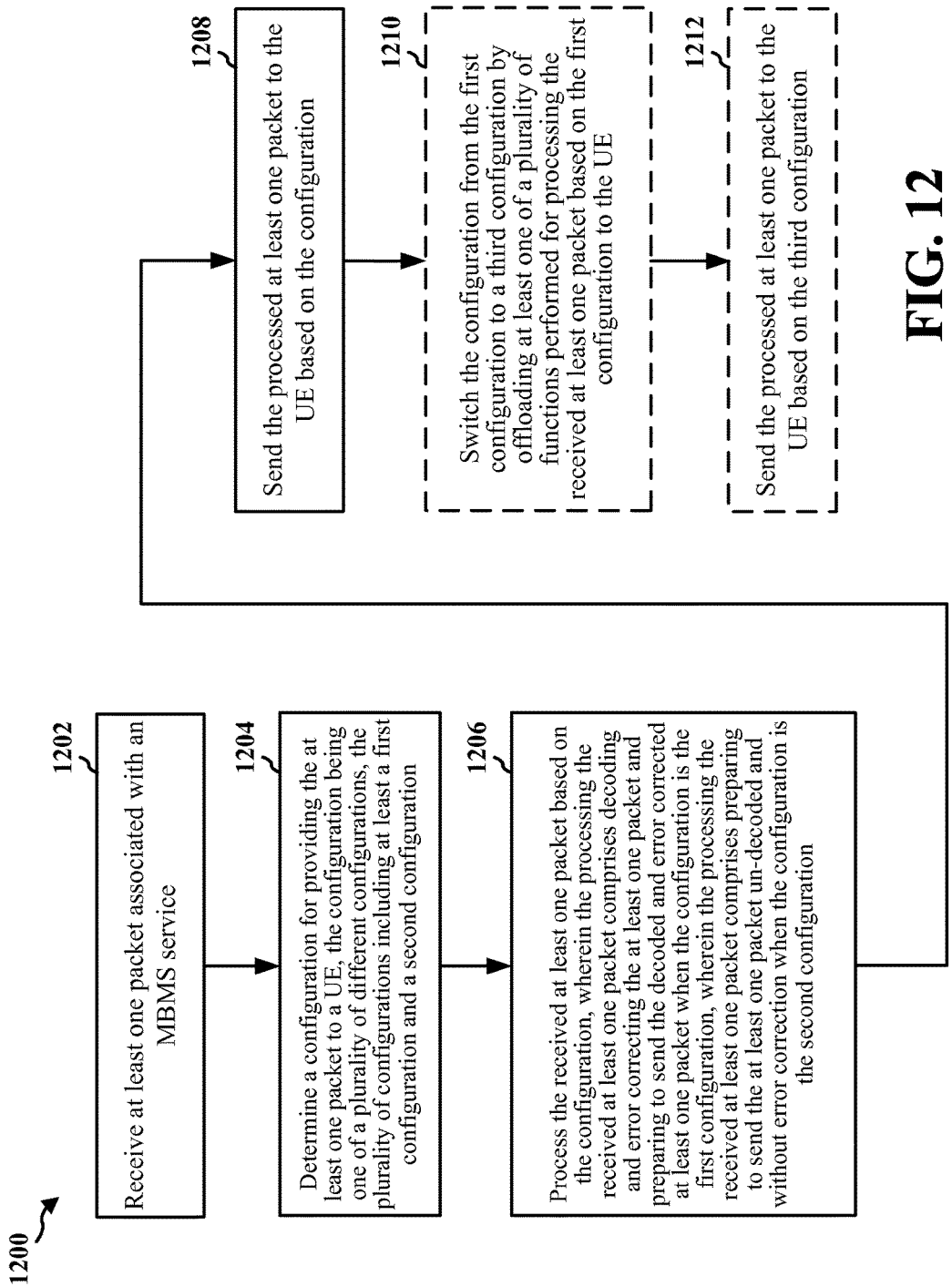
FIG. 12 is a flowchart of a method of wireless communication.

FIG. 12 is a flowchart 1200 of a method of wireless communication. The method may be performed by a receiver device (e.g., the receiver device 810, 910, 1010, 1110, or the apparatus 1302/1302'). In one aspect, the receiver device may be a UE. In one aspect, the method may be performed after the receiver device receives an MBMS service request (e.g., the MBMS service request 824, 834, 920, 1020, or 1120) from a UE (e.g., the low end client device 820, the high end client device 830, 930, 1030, or 1130). At 1202, the receiver device receives at least one packet (e.g., IP/UDP packet) associated with an MBMS service. In one aspect, the receiver device receives the at least one packet through an LTE modem (e.g., the LTE modem 812, 912, or 1112) from a base station (e.g., the base station 802 or 1002).

At 1204, the receiver device determines a configuration for providing the at least one packet to the UE (e.g., the low end client device 820, the high end client device 830, 930, 1030, or 1130). The configuration may be one of a plurality of different configurations. The plurality of configurations may include at least a first configuration and a second configuration. In one aspect, the receiver device may determine the configuration based on an MBMS service request received from the UE. In such aspect, the MBMS service request may contain indication regarding the configuration for providing the MBMS service to the UE; or the UE may send the MBMS service request to different ports of the receiver device to indicate the configuration for providing the MBMS service to the UE.

At 1206, the receiver device processes the received at least one packet based on the configuration. When the configuration is the first configuration, to process the received at least one packet, the receiver device decodes and error corrects the at least one packet, and prepares to send the decoded and error corrected at least one packet. When the configuration is the second configuration, to process the received at least one packet, the receiver device prepares to send the at least one packet un-decoded and without error correction. In one aspect, the receiver device uses a native MBMS middleware (e.g., the native MBMS middleware 814, 914, or 1114) to decode and error correct the received at least one packet when the configuration is the first configuration, and uses the native MBMS middleware to prepare to send the received at least one packet un-decoded and without error correction when the configuration is the second configuration.

At 1208, the receiver device sends the processed at least one packet (e.g., as part of the processed MBMS content 826 or the raw MBMS content 836) to the UE based on the configuration. In one aspect, the receiver device streams the processed at least one packet to the UE in DASH format based on the first configuration. In another aspect, the processed at least one packet is at least a portion of a MBMS downloaded file and the receiver device sends the MBMS downloaded file to the UE as a decoded file based on the first configuration. In yet another aspect, the receiver device streams the MBMS service to the UE as raw MBMS content through a UDP tunnel or IP tunnel based on the second configuration. In yet another aspect, the receiver device may further host a DASH server based on the first configuration. An example of the operations performed at 1202-1208 is described above with reference to FIG. 8.

At 1210, if the configuration associated with the UE for receiving the MBMS service is the first configuration, the receiver device may optionally switch the configuration from the first configuration to a third configuration by offloading at least one of a plurality of functions performed for processing the received at least one packet based on the first configuration to the UE. In one aspect of the disclosure, the plurality of functions to be offloaded to the UE may include one or more of file delivery (e.g., monitoring any downloads available through eMBMS broadcast and sending the downloaded file to clients), modem decoding (e.g., decoding IP/UDP packets), and FEC decoding (e.g., error correcting IP/UDP packets). In one aspect, the switch is the result of a switch request (e.g., the switch request 1122). An example of the operations performed at 1210 is described above with reference to FIG. 11.

At 1212, the receiver device may optionally send the processed at least one packet (e.g., as part of the semi-processed MBMS content 1138) to the UE based on the third configuration. An example of the operations performed at 1212 is described above with reference to diagram 1150 of FIG. 11.

Figure 13:
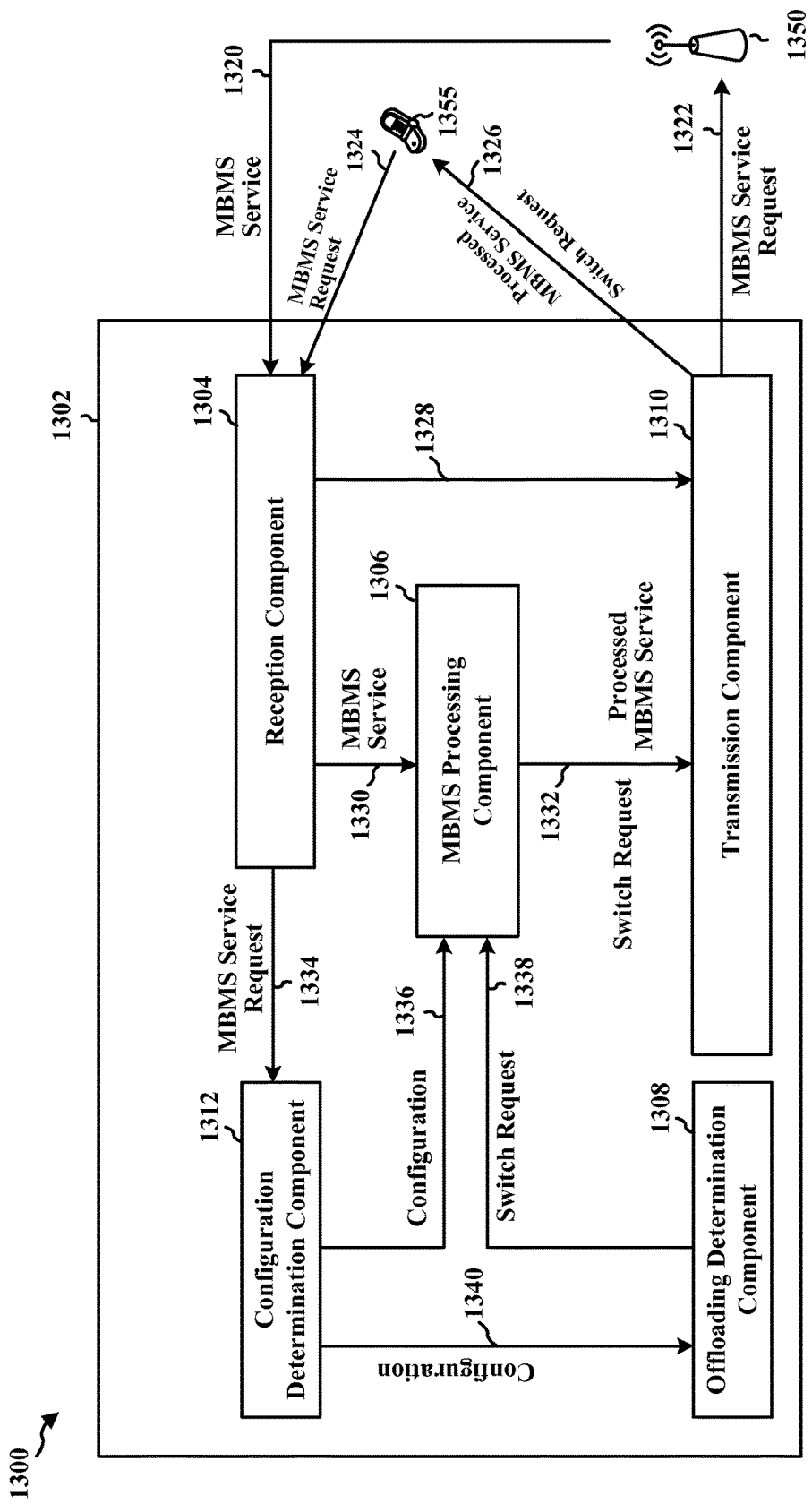
FIG. 13 is a conceptual data flow diagram illustrating the data flow between different modules/means/components in an exemplary apparatus.

FIG. 13 is a conceptual data flow diagram 1300 illustrating the data flow between different modules/means/components in an exemplary apparatus 1302. The apparatus may be an MBMS receiver device. The apparatus 1302 includes a reception component 1304 that receives MBMS service from a base station 1350 through data path 1320. The reception component 1304 may also receive MBMS service request from a UE 1355 through data path 1324. In one aspect, the reception component 1304 performs operations described above with reference to 1202 of FIG. 12.

The apparatus 1302 includes a transmission component 1310 that sends MBMS service request to the base station 1350 through data path 1322. The transmission component 1310 may also send processed MBMS service and switch request to the UE 1355 through data path 1326. The reception component 1304 and the transmission component 1310 coordinate the communications of the apparatus 1302 through data path 1328. In one aspect, the transmission component 1310 performs operations described above with reference to 1208 and 1212 of FIG. 12.

The apparatus 1302 also includes a configuration determination component 1312 that receives MBMS service request from the reception component 1304 through data path 1334 and determines a configuration for the apparatus 1302. In one aspect, the configuration determination component 1312 performs operations described above with reference to 1204 of FIG. 12.

The apparatus 1302 includes an offloading determination component 1308 that receives the configuration determined for the apparatus 1302 from the configuration determination component 1312 through data path 1340. The offloading determination component 1308 determines whether or not to offload some or all functions performed by the apparatus 1302 in relation to the MBMS service to the UE 1355 based on the received configuration and the current status of the apparatus 1302, and sends out a switch request if some or all functions performed by the apparatus 1302 in relation to the MBMS service are determined to be offloaded to the UE 1355.

The apparatus 1302 also includes an MBMS processing component 1306 that receives the configuration determined for the apparatus 1302 from the configuration determination component 1312 through data path 1336. The MBMS processing component 1306 also receives MBMS service from the reception component 1304 through data path 1330 and processes the received MBMS service according to the received configuration. The MBMS processing component 1306 also receives the switch request from the offloading determination component 1308 through data path 1338 and modifies the processing of the MBMS service accordingly. The MBMS processing component 1306 sends the processed MBMS service and the switch request to the transmission component 1310 through data path 1332. In one aspect, the MBMS processing component 1306 performs operations described above with reference to 1206 and 1210 of FIG. 12.

The apparatus may include additional components that perform each of the blocks of the algorithm in the aforementioned flowchart of FIG. 12. As such, each block in the aforementioned flowchart of FIG. 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 14:
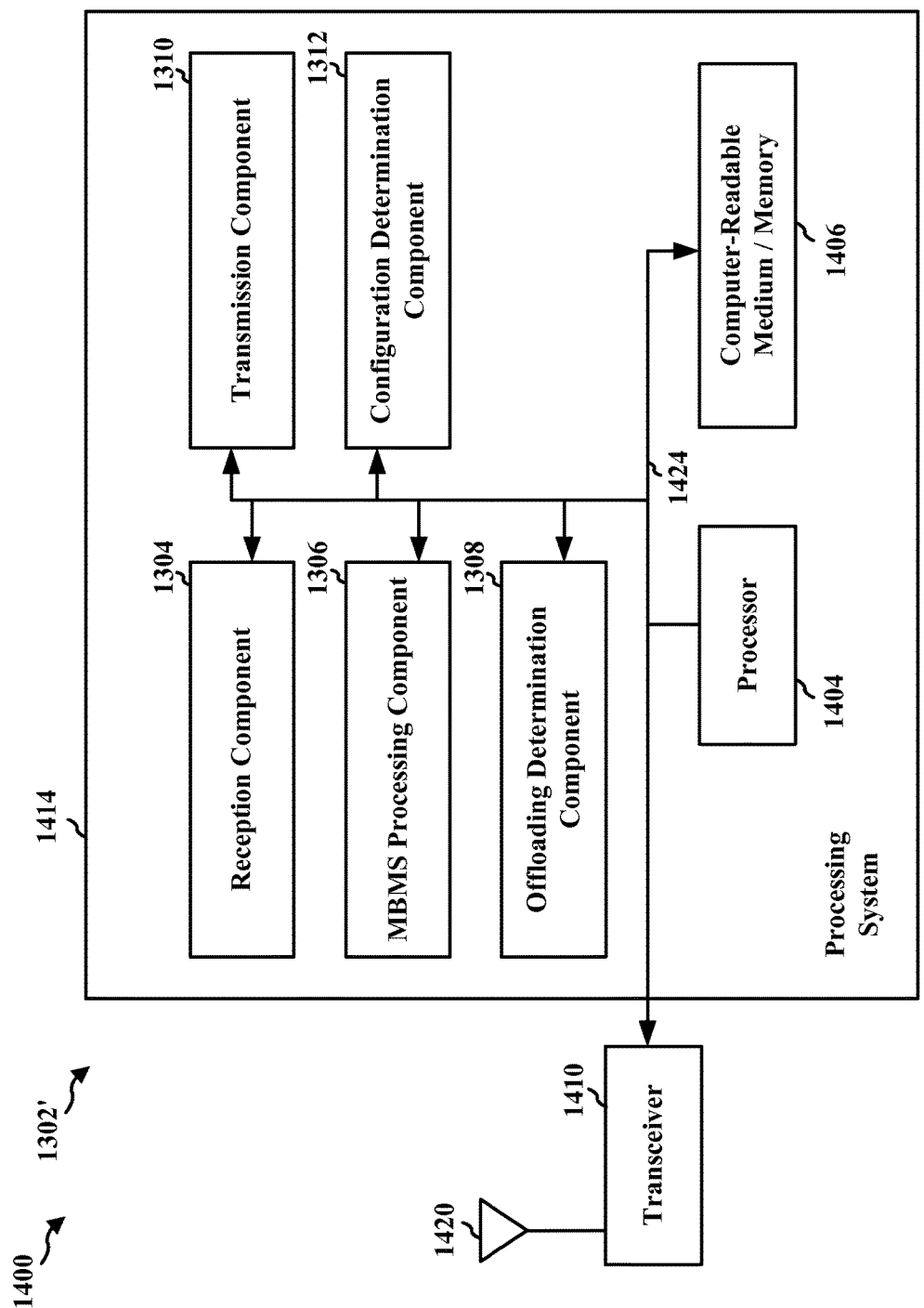
FIG. 14 is a diagram illustrating an example of a hardware implementation for an apparatus employing a processing system.

FIG. 14 is a diagram 1400 illustrating an example of a hardware implementation for an apparatus 1302' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware components, represented by the processor 1404, the components 1304, 1306, 1308, 1310, 1312 and the computer-readable medium/memory 1406. The bus 1424 may also liffl(various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The transceiver 1410 receives a signal from the one or more antennas 1420, extracts information from the received signal, and provides the extracted information to the processing system 1414, specifically the reception component 1304. In addition, the transceiver 1410 receives information from the processing system 1414, specifically the transmission component 1310, and based on the received information, generates a signal to be applied to the one or more antennas 1420. The processing system 1414 includes a processor 1404 coupled to a computer-readable medium/memory 1406. The processor 1404 is responsible for general processing, including the execution of software stored on the computer-readable medium/memory 1406. The software, when executed by the processor 1404, causes the processing system 1414 to perform the various functions described supra for any particular apparatus. The computer-readable medium/memory 1406 may also be used for storing data that is manipulated by the processor 1404 when executing software. The processing system further includes at least one of the components 1304, 1306, 1308, 1310, and 1312. The components may be software components running in the processor 1404, resident/stored in the computer readable medium/memory 1406, one or more hardware components coupled to the processor 1404, or some combination thereof. The processing system 1414 may be a component of the UE 650 and may include the memory 660 and/or at least one of the TX processor 668, the RX processor 656, and the controller/processor 659.

In one aspect, the apparatus 1302/1302' for wireless communication includes means for receiving at least one packet associated with an MBMS service, means for determining a configuration for providing the at least one packet to a UE, means for processing the received at least one packet based on the configuration, and means for sending the processed at least one packet to the UE based on the configuration.

In one aspect, the means for sending the processed at least one packet is configured to stream the processed at least one packet to the UE in DASH format based on a first configuration. In one aspect, the processed at least one packet is at least a portion of a MBMS downloaded file and the means for sending the processed MBMS service is configured to send the MBMS downloaded file to the UE as a decoded file when the configuration is the first configuration. In one aspect, the means for sending the processed at least one packet is configured to stream the processed at least one packet un-decoded and without error correction to the UE through a UDP tunnel or IP tunnel when the configuration is a second configuration.

In one aspect, the apparatus 1302/1302' for wireless communication further includes means for hosting a DASH server when the configuration is the first configuration. The means for hosting the DASH server may be configured to launch the DASH server, monitor the performance of the DASH server, managing the operation of the DASH server, etc. In one aspect, the apparatus 1302/1302' for wireless communication further includes means for switching the configuration from the first configuration to a third configuration. In one aspect, the means for switching is configured to offload some of the functions performed by the apparatus 1302/1302'.

The aforementioned means may be one or more of the aforementioned components of the apparatus 1302 and/or the processing system 1414 of the apparatus 1302' configured to perform the functions recited by the aforementioned means. As described supra, the processing system 1414 may include the TX Processor 668, the RX Processor 656, and the controller/processor 659. As such, in one aspect, the aforementioned means may be the TX Processor 668, the RX Processor 656, and the controller/processor 659 configured to perform the functions recited by the aforementioned means.

Figure 15:
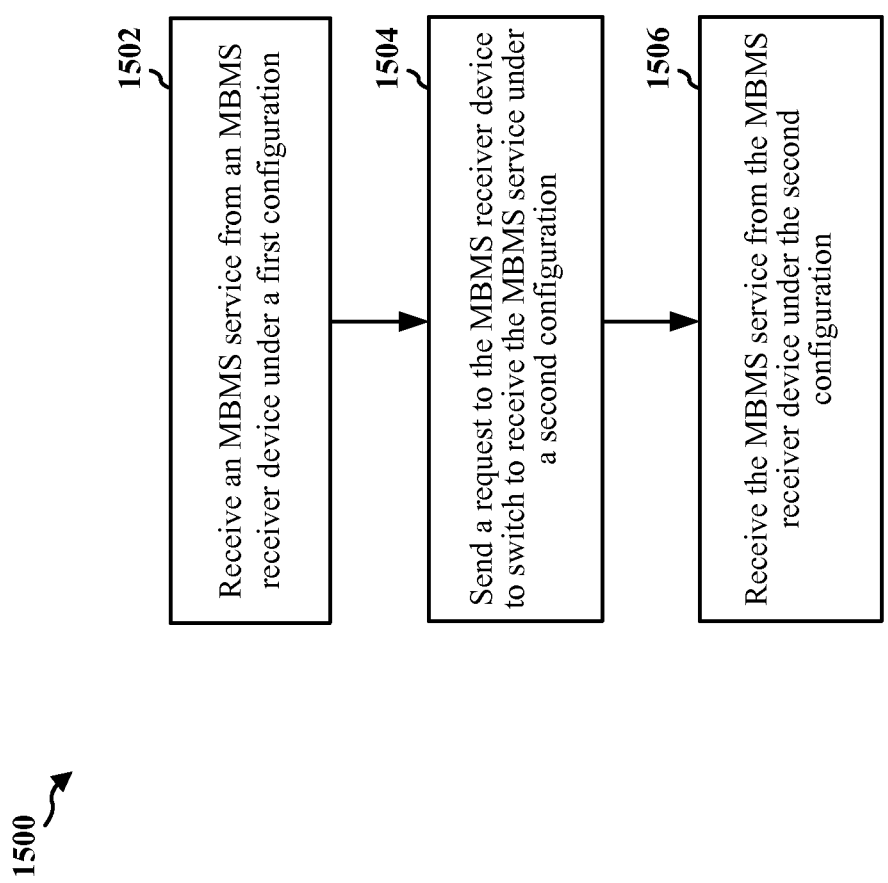
FIG. 15 is a flowchart of a method of wireless communication.

FIG. 15 is a flowchart 1500 of a method of wireless communication. The method may be performed by a high end client device (e.g., the high end client device 830, 930, 1030, 1130, or the apparatus 1602/1602'). In one aspect, the high end client device may be a UE. In one aspect, the method may be performed after the high end client device sends an MBMS service request (e.g., the MBMS service request 834, 920, 1020, or 1120) to an MBMS receiver device (e.g., the receiver device 810, 910, 1010, or 1110). At 1502, the high end client device receives an MBMS service from the MBMS receiver device under a first configuration.

At 1504, the high end client device sends a request to the MBMS receiver device to switch to receive the MBMS service under a second configuration. In one aspect, the request may be a device-to-device message. At 1506, the high end client device receives the MBMS service from the MBMS receiver device under the second configuration.

In one aspect, packets (e.g., IP/UDP packets) received from the MBMS receiver device for the MBMS service are un-decoded or without error correction under the first configuration, and packets received from the MBMS receiver device for the MBMS service are decoded and error corrected by the MBMS receiver device under the second configuration. In such aspect, the high end client device uses a remote MBMS middleware (e.g., the remote MBMS middleware 934) to handle the received packets under the first configuration, and uses a thin MBMS client (e.g., the thin MBMS client 932) to handle the received packets under the second configuration. An example of the operations performed in such aspect is described above with reference to FIG. 9.

In one aspect, the MBMS service may be received in DASH format under the second configuration. In such aspect, the MBMS service may be received as a decoded file under the second configuration. In such aspect, the high end client device may further display a DASH enabled media player or a file delivery user interface under the second configuration. In such aspect, the MBMS service may be received as raw MBMS content through a UDP tunnel or IP tunnel under the first configuration. In such aspect, to receive the MBMS service under the first configuration, the high end client device may further host a DASH server and may enable playing of DASH content through a DASH enabled media player.

In one aspect, packets received from the MBMS receiver device for the MBMS service are decoded and error corrected by the MBMS receiver device under the first configuration, and packets received from the MBMS receiver device for the MBMS service are un-decoded or without error correction under the second configuration. In such aspect, the high end client device uses a thin MBMS client (e.g., the thin MBMS client 1132) to handle the received packets under the first configuration, and uses a remote MBMS middleware (e.g., the remote MBMS middleware 1134) to handle the received packets under the second configuration. An example of the operations performed in such aspect is described above with reference to FIG. 11.

In one aspect, packets received from the MBMS receiver device for the MBMS service are un-decoded or without error correction under the first configuration, and at least one of a plurality of functions performed by the high end client device under the first configuration is to be offloaded to the MBMS receiver device under the second configuration. The plurality of functions to be offloaded to the MBMS receiver device may include one or more of file delivery (e.g., monitoring any downloads available through eMBMS broadcast and sending the downloaded file to clients), modem decoding (e.g., decoding IP/UDP packets), and FEC decoding (e.g., error correcting IP/UDP packets). The request to switch to the second configuration may be triggered by at least one of low memory, high CPU usage, low battery, low storage, non availability of forward error correction (FEC) decoding schemes, or non availability of support for streaming protocol at the high end client device. An example of the operations performed in such aspect is described above with reference to FIG. 9 above.

In one aspect, the high end client device may further switch to a third configuration under which the MBMS service is received without involvement of the MBMS receiver device. In such aspect, the high end client device may receive the MBMS service from a base station directly.

Figure 16:
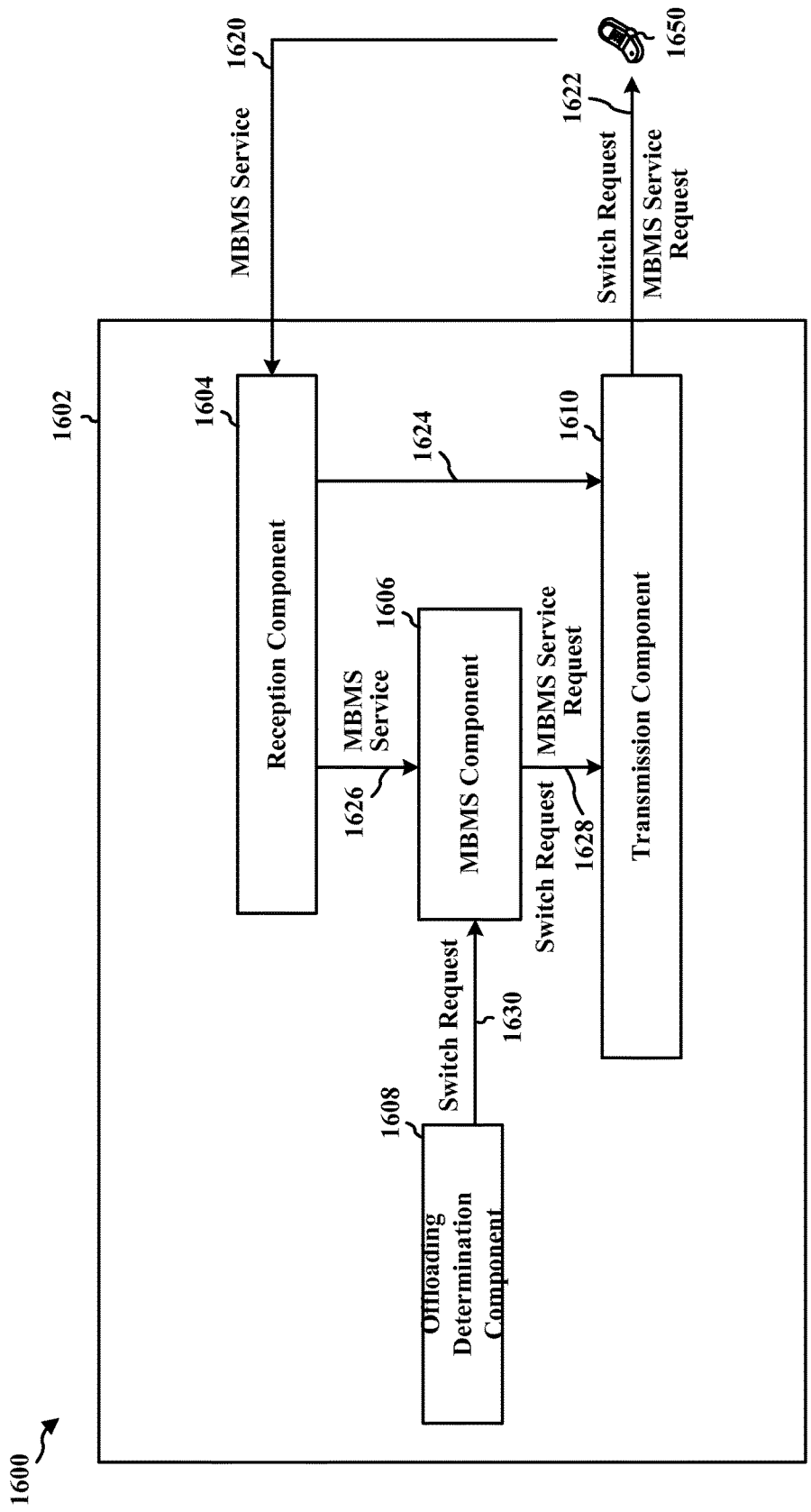
FIG. 16 is a conceptual data flow diagram illustrating the data flow between different modules/means/components in an exemplary apparatus.

FIG. 16 is a conceptual data flow diagram 1600 illustrating the data flow between different modules/means/components in an exemplary apparatus 1602. The apparatus may be a high end client device. The apparatus 1602 includes a reception component 1604 that receives MBMS service from an MBMS receiver device 1650 through data path 1620. In one aspect, the reception component 1604 performs operations described above with reference to 1502 and 1506 of FIG. 15.

The apparatus 1602 includes a transmission component 1610 that sends MBMS service request and switch request to the MBMS receiver device 1650 through data path 1622. The reception component 1604 and the transmission component 1610 coordinate the communications of the apparatus 1602 through data path 1624. In one aspect, the transmission component 1610 performs operations described above with reference to 1504 of FIG. 15.

The apparatus 1602 includes an offloading determination component 1608 that determines whether or not to offload some or all functions performed by the apparatus 1602 in relation to the MBMS service to the receiver device 1650 based on the current status of the apparatus 1602, and sends out a switch request if some or all functions performed by the apparatus 1602 in relation to the MBMS service are determined to be offloaded to the receiver device 1650.

The apparatus 1602 also includes an MBMS component 1606 that receives MBMS service from the reception component 1604 through data path 1626 and consumes the received MBMS service according to a configuration. The MBMS component 1606 also receives the switch request from the offloading determination component 1608 through data path 1630 and modifies the processing of the MBMS service accordingly. The MBMS component 1606 sends the MBMS service request and the switch request to the transmission component 1610 through data path 1628. In one aspect, the MBMS component 1606 performs operations described above with reference to 1502 and 1506 of FIG. 15.

The apparatus may include additional components that perform each of the blocks of the algorithm in the aforementioned flowchart of FIG. 15. As such, each block in the aforementioned flowchart of FIG. 15 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 17:
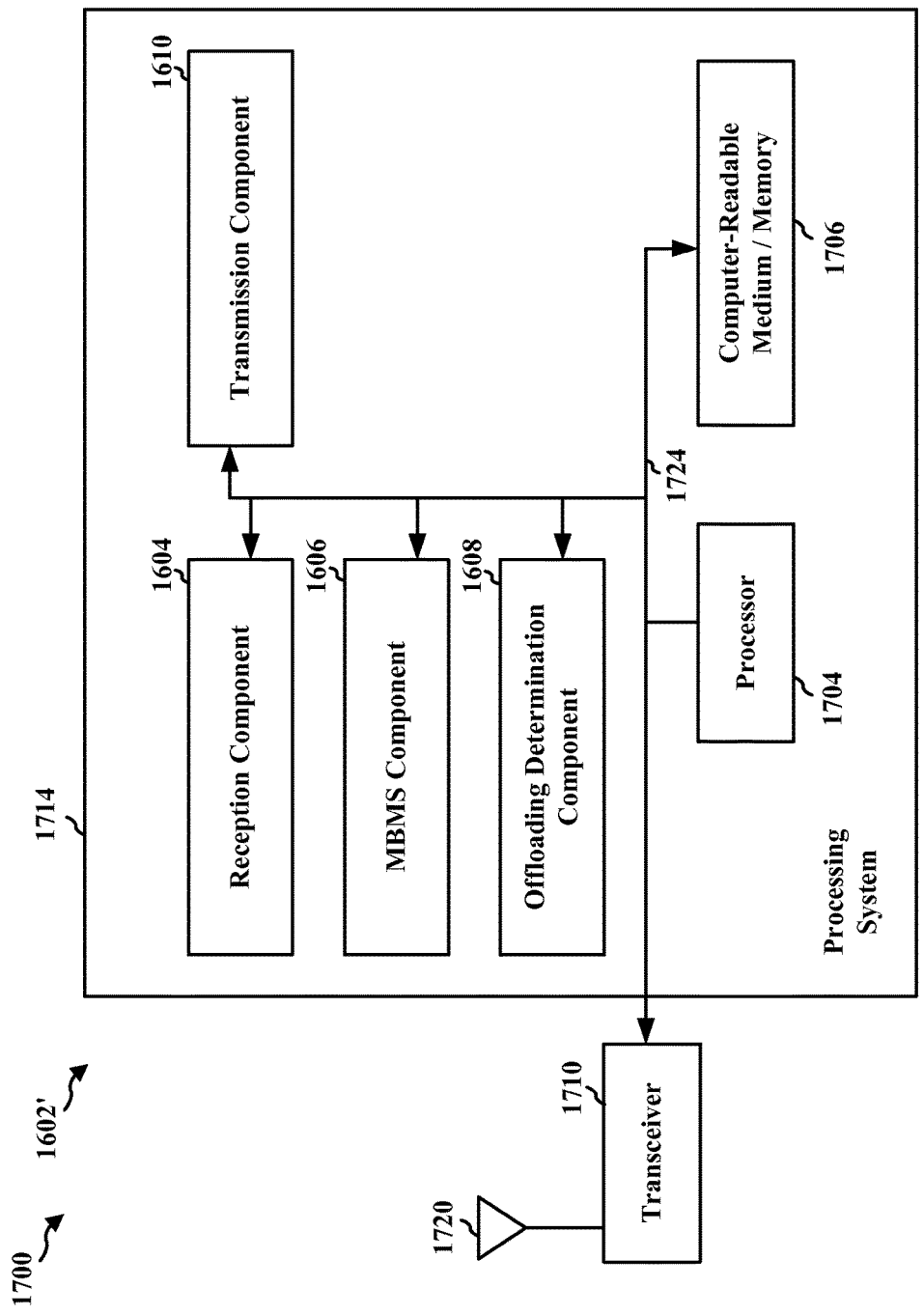
FIG. 17 is a diagram illustrating an example of a hardware implementation for an apparatus employing a processing system.

FIG. 17 is a diagram 1700 illustrating an example of a hardware implementation for an apparatus 1602' employing a processing system 1714. The processing system 1714 may be implemented with a bus architecture, represented generally by the bus 1724. The bus 1724 may include any number of interconnecting buses and bridges depending on the specific application of the processing system 1714 and the overall design constraints. The bus 1724 links together various circuits including one or more processors and/or hardware components, represented by the processor 1704, the components 1604, 1606, 1608, 1610 and the computer-readable medium/memory 1706. The bus 1724 may also link various other circuits such as timing sources, peripherals, voltage regulators, and power management circuits, which are well known in the art, and therefore, will not be described any further.

The processing system 1714 may be coupled to a transceiver 1710. The transceiver 1710 is coupled to one or more antennas 1720. The transceiver 1710 provides a means for communicating with various other apparatus over a transmission medium. The transceiver 1710 receives a signal from the one or more antennas 1720, extracts information from the received signal, and provides the extracted information to the processing system 1714, specifically the reception component 1604. In addition, the transceiver 1710 receives information from the processing system 1714, specifically the transmission component 1610, and based on the received information, generates a signal to be applied to the one or more antennas 1720. The processing system 1714 includes a processor 1704 coupled to a computer-readable medium/memory 1706. The processor 1704 is responsible for general processing, including the execution of software stored on the computer-readable medium/memory 1706. The software, when executed by the processor 1704, causes the processing system 1714 to perform the various functions described supra for any particular apparatus. The computer-readable medium/memory 1706 may also be used for storing data that is manipulated by the processor 1704 when executing software. The processing system further includes at least one of the components 1604, 1606, 1608, and 1610. The components may be software components running in the processor 1704, resident/stored in the computer readable medium/memory 1706, one or more hardware components coupled to the processor 1704, or some combination thereof. The processing system 1714 may be a component of the UE 650 and may include the memory 660 and/or at least one of the TX processor 668, the RX processor 656, and the controller/processor 659.

In one aspect, the apparatus 1602/1602' for wireless communication includes means for receiving an MBMS service from an MBMS receiver device under a first configuration, means for sending a request to the MBMS receiver device to switch to receive the MBMS service under a second configuration, and means for receiving the MBMS service from the MBMS receiver device under the second configuration.

In one aspect, the apparatus 1602/1602' for wireless communication may further include means for displaying a DASH enabled media player or a file delivery user interface under the second configuration. In one aspect, the means for receiving the MBMS service under the first configuration is configured to host a DASH server and to enable playing of DASH content through a DASH enabled media player. In one aspect, the apparatus 1602/1602' for wireless communication may further include means for switching to a third configuration under which the MBMS service is received without involvement of the MBMS receiver device.

The aforementioned means may be one or more of the aforementioned components of the apparatus 1602 and/or the processing system 1714 of the apparatus 1602' configured to perform the functions recited by the aforementioned means. As described supra, the processing system 1714 may include the TX Processor 668, the RX Processor 656, and the controller/processor 659. As such, in one aspect, the aforementioned means may be the TX Processor 668, the RX Processor 656, and the controller/processor 659 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C.

Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication of a device, comprising:
    receiving at least one packet of a multimedia broadcast multicast service (MBMS) service;
    determining a configuration of the device for providing the at least one packet to a user equipment (UE), the configuration of the device being one of a plurality of configurations, the plurality of configurations comprising at least a first configuration having a first amount of first processing resources and a second configuration having a second amount of second processing resources;
    processing the at least one packet based on processing resources of the device, wherein the processing the at least one packet comprises decoding and error correcting the at least one packet and preparing to send the at least one packet decoded and error corrected when the configuration of the device is the first configuration and the processing the at least one packet comprises preparing to send the at least one packet un-decoded and without error correction when the configuration of the device is the second configuration, wherein the first amount of first processing resources are greater than the second amount of the second processing resources; and
    sending the at least one packet to the UE based on the configuration of the device.

2. The method of claim 1, wherein the sending the at least one packet comprises streaming the at least one packet to the UE in Dynamic Adaptive Streaming over Hypertext Transfer Protocol (HTTP) (DASH) format or as at least a portion of a decoded file when the configuration is the first configuration.

3. The method of claim 1, wherein the sending the at least one packet comprises streaming the at least one packet un-decoded and without error correction to the UE through a User Datagram Protocol (UDP) tunnel or Internet Protocol (IP) tunnel when the configuration of the device is the second configuration.

4. The method of claim 1 further comprising hosting a Dynamic Adaptive Streaming over Hypertext Transfer Protocol (HTTP) (DASH) server when the configuration of the device is the first configuration.

5. The method of claim 1 further comprising switching the configuration of the device from the first configuration to a third configuration, wherein the switching the configuration of the device comprises offloading at least one of a plurality of functions performed for processing the at least one packet based on the first configuration to the UE.

6. The method of claim 5, wherein the plurality of functions comprises one or more of file delivery, modem decoding, and forward error correction (FEC) decoding.

7. The method of claim 5, wherein the switching the configuration of the device from the first configuration to the third configuration is triggered by at least one of low memory, high computer processing unit (CPU) usage, low battery, low storage, service already decoded, non availability of forward error correction (FEC) decoding schemes, or non availability of support for streaming protocol.

8. A method of wireless communication of a user equipment (UE), comprising:
    receiving at least one packet of a Multimedia Broadcast Multicast Service (MBMS) service from an MBMS receiver device in a first configuration, the first configuration having a first amount of first processing resources;
    sending a request to the MBMS receiver device to switch to receive the MBMS service in a second configuration based at least in part on processing resources of the second configuration, the second configuration having a second amount of second processing resources;
    receiving the MBMS service from the MBMS receiver device in the second configuration; and
    processing the at least one packet based on processing resources of the UE, wherein the processing the at least one packet comprises decoding and error correcting the at least one packet and preparing to send the at least one packet decoded and error corrected when the configuration of the UE is the first configuration and the processing the at least one packet comprises preparing to send the at least one packet un-decoded and without error correction when the configuration of the device is the second configuration, wherein the first amount of first processing resources are greater than the second amount of the second processing resources.

9. The method of claim 8, wherein the MBMS service is received in Dynamic Adaptive Streaming over Hypertext Transfer Protocol (HTTP) (DASH) format or as a decoded file in the second configuration.

10. The method of claim 8 further comprising displaying a Dynamic Adaptive Streaming over Hypertext Transfer Protocol (HTTP) (DASH) enabled media player or a file delivery user interface in the second configuration.

11. The method of claim 8, wherein the MBMS service is received as raw MBMS content through a User Datagram Protocol (UDP) tunnel or Internet Protocol (IP) tunnel in the first configuration.

12. The method of claim 8, wherein the receiving the MBMS service in the first configuration comprises:
    hosting a Dynamic Adaptive Streaming over Hypertext Transfer Protocol (HTTP) (DASH) server; and
    enabling playing of DASH content through a DASH enabled media player.

13. The method of claim 8, wherein packets received from the MBMS receiver device for the MBMS service are un-decoded or without error correction in the first configuration, wherein at least one of a plurality of functions performed by the UE in the first configuration is to be offloaded to the MBMS receiver device in the second configuration.

14. The method of claim 8 further comprising switching to a third configuration in which the MBMS service is received without involvement of the MBMS receiver device.

15. An apparatus for wireless communication of a device, comprising:
    a memory; and
    at least one processor coupled to the memory and configured to:

receive at least one packet of a multimedia broadcast multicast service (MBMS) service;

determine a configuration of the device for providing the at least one packet to a user equipment (UE), the configuration of the device being one of a plurality of configurations, the plurality of configurations comprising at least a first configuration having a first amount of first processing resources and a second configuration having a second amount of second processing resources;

process the at least one packet based on processing resources of the device, wherein the processing the at least one packet comprises decoding and error correcting the at least one packet and preparing to send the at least one packet decoded and error corrected when the configuration of the device is the first configuration and the processing the at least one packet comprises preparing to send the at least one packet un-decoded and without error correction when the configuration of the device is the second configuration, wherein the first amount of first processing resources are greater than the second amount of second processing resources; and send the at least one packet to the UE based on the configuration of the device.

16. The apparatus of claim 15, wherein, to send the at least one packet, the at least one processor is configured to stream the at least one packet to the UE in Dynamic Adaptive Streaming over Hypertext Transfer Protocol (HTTP) (DASH) format or as at least a portion of a decoded file when the configuration of the device is the first configuration.

17. The apparatus of claim 15, wherein, to send the at least one packet, the at least one processor is configured to stream the at least one packet un-decoded and without error correction to the UE through a User Datagram Protocol (UDP) tunnel or Internet Protocol (IP) tunnel when the configuration of the device is the second configuration.

18. The apparatus of claim 15, wherein the at least one processor is further configured to host a Dynamic Adaptive Streaming over Hypertext Transfer Protocol (HTTP) (DASH) server when the configuration of the device is the first configuration.

19. The apparatus of claim 15, wherein the at least one processor is further configured to switch the configuration of the device from the first configuration to a third configuration, wherein, to switch the configuration of the device, the at least one processor is configured to offload at least one of a plurality of functions performed for processing the at least one packet based on the first configuration to the UE.

20. The apparatus of claim 19, wherein the plurality of functions comprises one or more of file delivery, modem decoding, and forward error correction (FEC) decoding.

21. The apparatus of claim 19, wherein the at least one processor is configured to switch the configuration of the device from the first configuration to the third configuration in response to at least one of low memory, high computer processing unit (CPU) usage, low battery, low storage, service already decoded, non availability of forward error correction (FEC) decoding schemes, or non availability of support for streaming protocol.

22. An apparatus for wireless communication, the apparatus being a user equipment (UE), comprising:

a memory; and at least one processor coupled to the memory and configured to:

receive at least one packet of a Multimedia Broadcast Multicast Service (MBMS) service from an MBMS receiver device in a first configuration, the first configuration having a first amount of first processing resources;

send a request to the MBMS receiver device to switch to receive the MBMS service in a second configuration based at least in part on processing resources of the second configuration, the second configuration having a second amount of second processing resources;

receive the MBMS service from the MBMS receiver device in the second configuration; and process the at least one packet based on processing resources of the UE, wherein the processing the at least one packet comprises decoding and error correcting the at least one packet and preparing to send the at least one packet decoded and error corrected when the configuration of the UE is the first configuration and the processing the at least one packet comprises preparing to send the at least one packet un-decoded and without error correction when the configuration of the device is the second configuration, wherein the first amount of first processing resources are greater than the second amount of the second processing resources.

23. The apparatus of claim 22, wherein the MBMS service is received in Dynamic Adaptive Streaming over Hypertext Transfer Protocol (HTTP) (DASH) format or as a decoded file in the second configuration.

24. The apparatus of claim 22, wherein the at least one processor is further configured to display a Dynamic Adaptive Streaming over Hypertext Transfer Protocol (HTTP) (DASH) enabled media player or a file delivery user interface in the second configuration.

25. The apparatus of claim 22, wherein the MEMS service is received as raw MBMS content through a User Datagram Protocol (UDP) tunnel or Internet Protocol (IP) tunnel in the first configuration.

26. The apparatus of claim 22, wherein, to receive the MBMS service in the first configuration, the at least one processor is configured to:

host a Dynamic Adaptive Streaming over Hypertext Transfer Protocol (HMI) (DASH) server; and enable playing of DASH content through a DASH enabled media player.

27. The apparatus of claim 22, wherein packets received from the MBMS receiver device for the MBMS service are un-decoded or without error correction in the first configuration, wherein at least one of a plurality of functions performed by the UE under the first configuration is to be offloaded to the MBMS receiver device in the second configuration.

28. The apparatus of claim 22, wherein the at least one processor is further configured to switch to a third configuration in which the MBMS service is received without involvement of the MBMS receiver device.

* * * * *